July 7, 1959 R. L. SMIRL 2,893,526
AUTOMATIC CLUTCH CONTROL
Filed Oct. 22, 1952 4 Sheets-Sheet 2
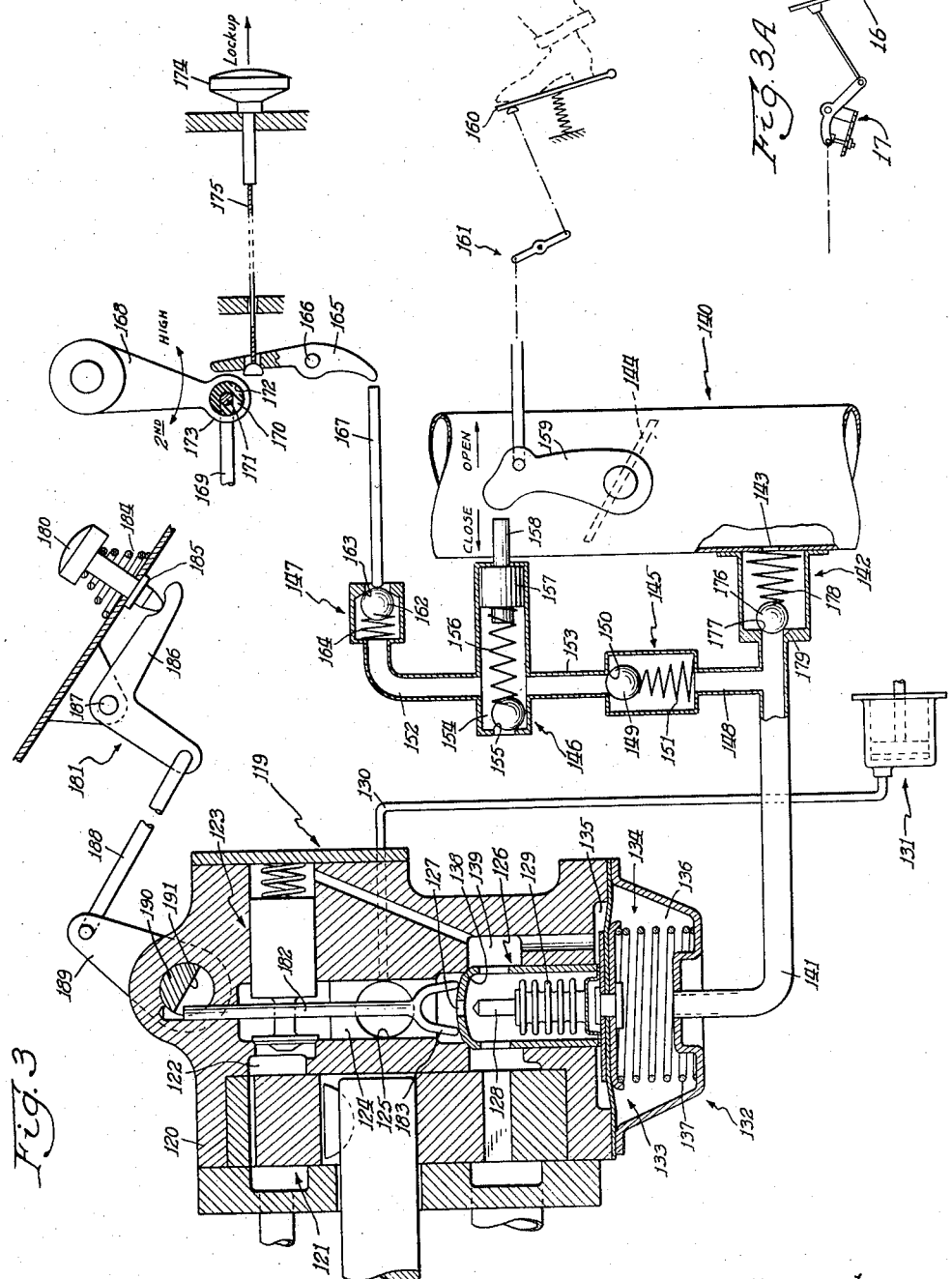
Inventor:
Richard L. Smirl
By: Keith J. Blewer
Atty.

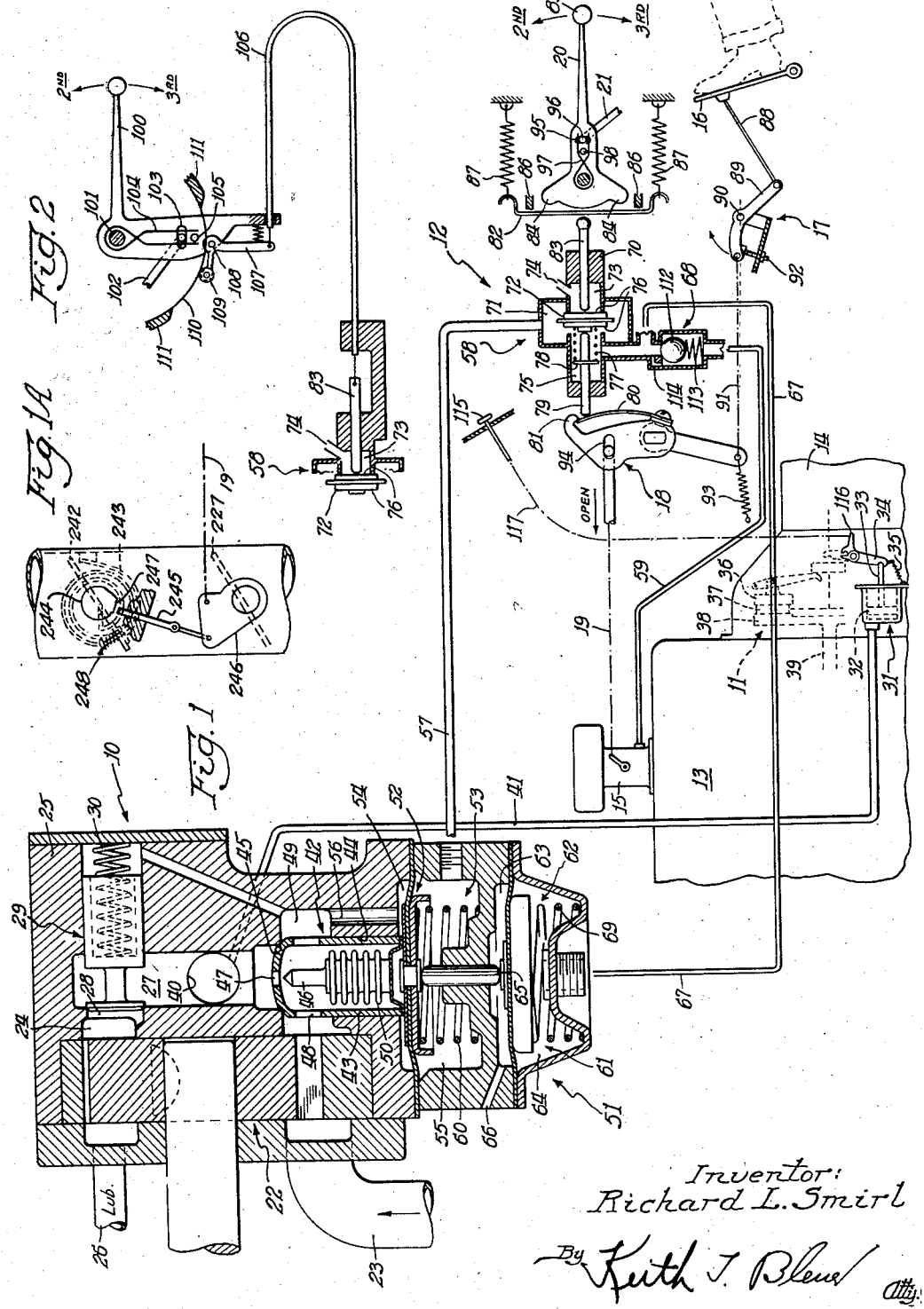

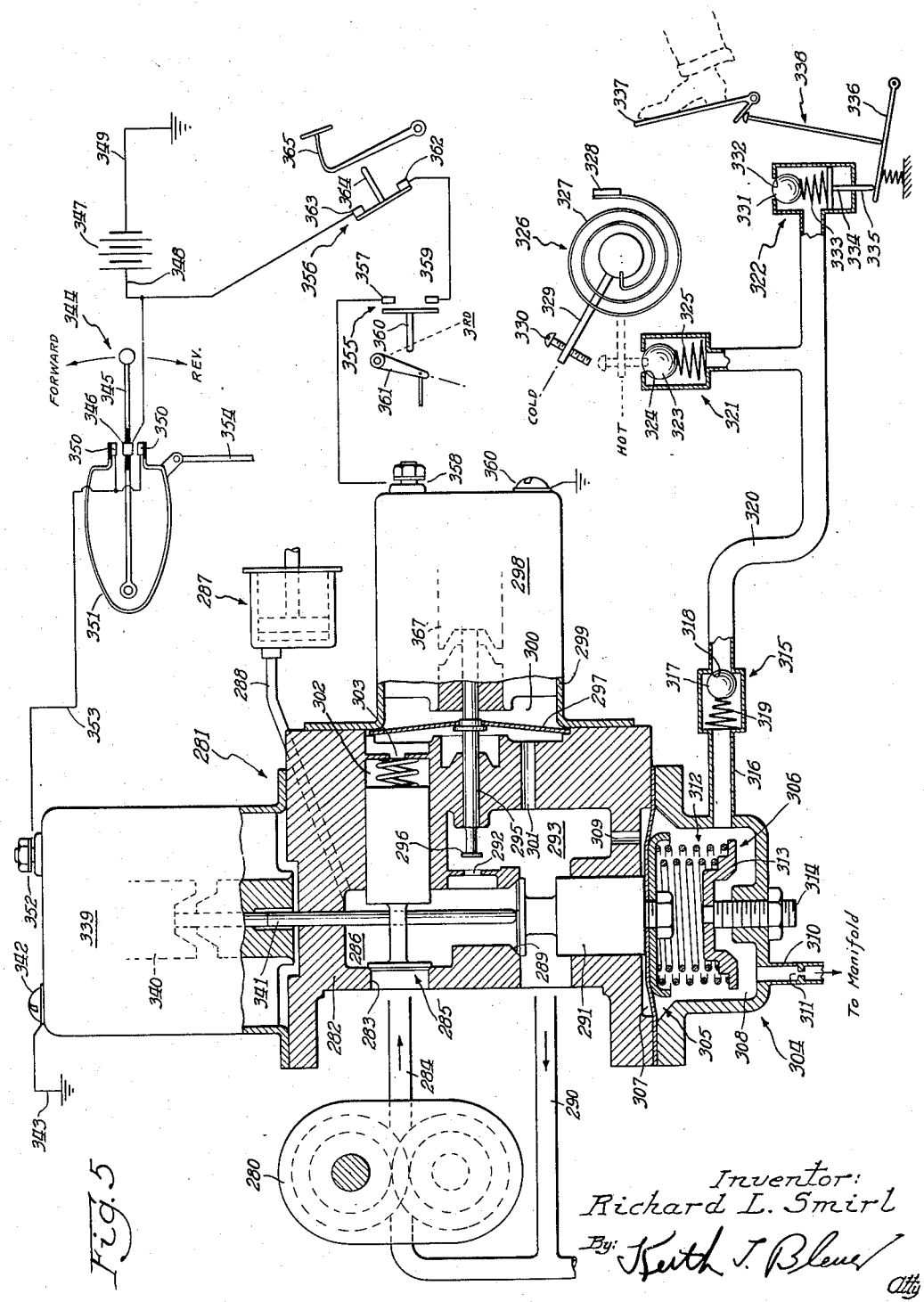

United States Patent Office 2,893,526
Patented July 7, 1959

2,893,526

AUTOMATIC CLUTCH CONTROL

Richard L. Smirl, La Grange Park, Ill., assignor to Borg-Warner Corporation, Chicago, Ill., a corporation of Illinois Application October 22, 1952, Serial No. 316,133

72 Claims. (Cl. 192—.052)

This invention relates to an automatic clutch control construction, and more particularly to semi-automatic power actuated means for engaging and disengaging a clutch in an internal combustion engine installation for a vehicle.

In the past few years the trend in the automotive industries has been toward semi-automatic and fully automatic transmissions. In most cases these automatic transmissions are quite different from conventional countershaft transmissions which were used in most automobiles in the past several years and still are used in a great many automobiles. Although the recently developed automatic transmissions make the driving of an automotive vehicle substantially easier and have met with widespread acceptance, such transmissions are much more expensive to produce than the conventional countershaft transmissions, partly because of the more complicated constructions usually including some sort of hydraulic coupling, and also because of the complicated control mechanisms. In addition, somewhat more engine power is absorbed by an automatic transmission through the hydraulic coupling, the automatic engaging devices, and the more complicated gearing arrangements.

The clutch control system of the present invention is intended to incorporate most of the advantages of an automatic transmission while utilizing a conventional countershaft transmission in connection with a power actuated clutch. The system is arranged so that the clutch will be disengaged when the vehicle accelerator pedal is released and/or the transmission is shifted. Means are incorporated whereby the clutch will automatically and smoothly engage when the accelerator pedal is depressed, and after the vehicle has begun to move, the transmission can be manually shifted into the higher gear ratios without the necessity for manually disengaging the clutch. In addition, means are provided to prevent vehicle "creep" under fast idle condition when the engine is cold.

It is an object of the present invention to provide an improved automatic clutch control arrangement.

Another object of the invention is to provide a simplified system for semi-automatically controlling clutch engagement for a conventional countershaft type vehicle transmission.

A further object of the invention is to provide improved automatic controls for a power actuated clutch insuring smooth engagement of the clutch under all conditions.

An additional object of the invention is to provide a semi-automatic clutch arrangement which will automatically prevent any tendency for the vehicle to creep when the transmission is in gear and the engine is relatively cold resulting in a fast engine idle condition.

Still another object of the invention is to provide improved and simplified means for automatically applying engaging pressure to a vehicle engine clutch in accordance with the torque being transmitted by the engine to the vehicle drive wheels.

A still further object of the present invention is to provide, in an automatic clutch control system, thermostatic control means for preventing changes in temperature from effecting the clutch control characteristics.

Another object of the invention is to provide automatic clutch control mechanism for facilitating parking maneuvers in close quarters regardless of the very high cold idle speeds required by some engines.

A further object of the invention is to provide automatic clutch control mechanism in which the time lag between actuation of the control elements and resultant actuation of the clutch is virtually eliminated.

Other objects, features and advantages of the present invention will be apparent from the following detailed description of several embodiments, by way of preferred examples only, taken in conjunction with the accompanying drawings, in which:

Fig. 1 is a schematic, partially sectional view of a clutch and clutch control system according to this invention;

Fig. 1A is a side elevational view of a fast idle controlling mechanism for a vehicle engine that may be used in connection with the control system illustrated in Fig. 1;

Fig. 2 is a schematic, partially sectional view of a second embodiment of a portion of the control arrangement of Fig. 1;

Fig. 3 is a schematic, partially sectional view of another embodiment of the clutch control system;

Fig. 3A is a side view of a throttle control linkage that can be used in connection with the Fig. 3 embodiment of the clutch control system;

Fig. 5 is a schematic, partially sectional view of a still further embodiment of the clutch control system of this invention.

Figure 4:
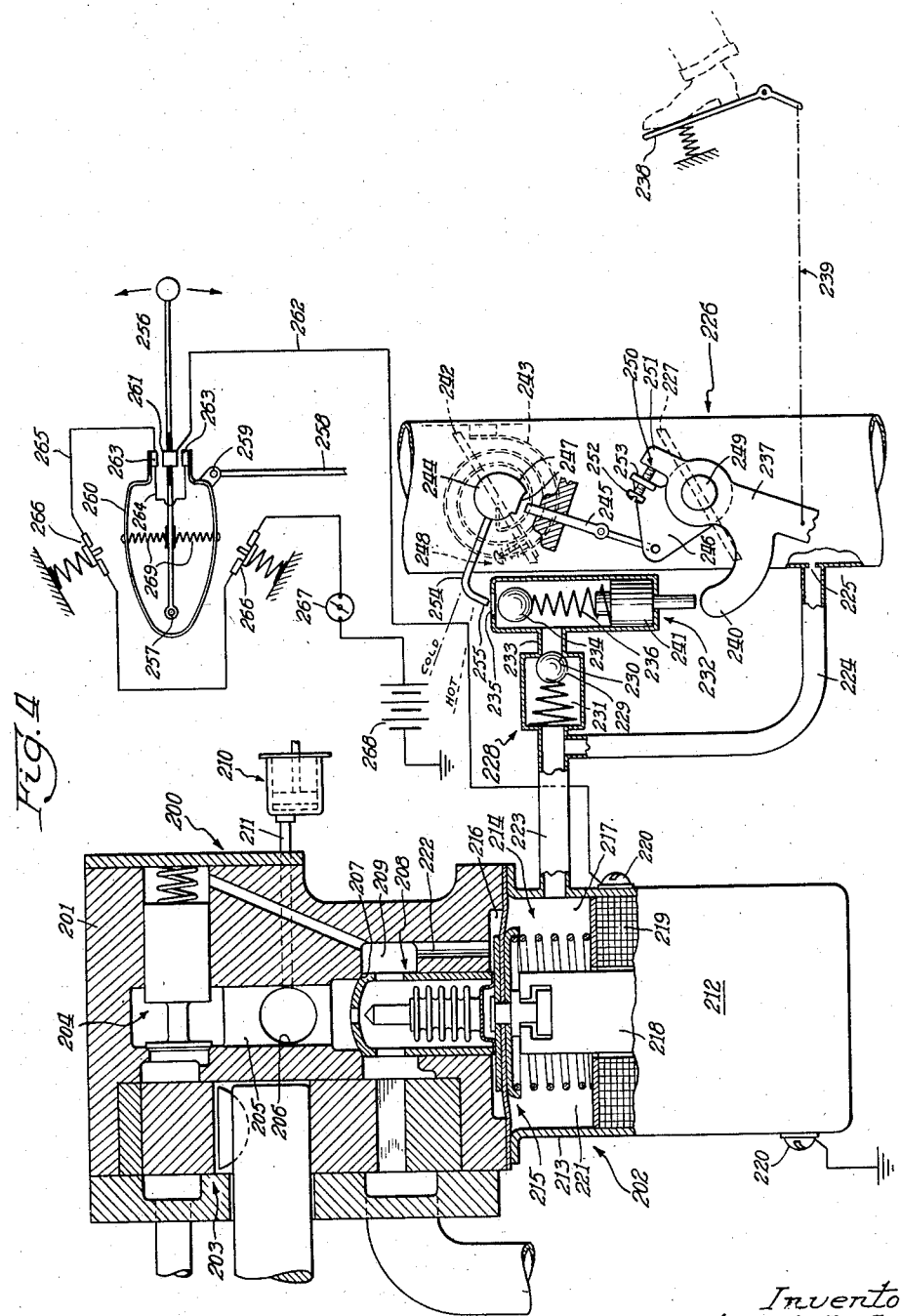
Fig. 4 is a schematic, partially sectional view of a further embodiment of the clutch control system of the present invention.

Referring now to Fig. 1, the reference numeral 10 refers generally to a pressure control mechanism which is arranged to control the fluid pressure for clutch engagement delievery to a fluid pressure engageable clutch mechanism 11, in accordance with the operation of a control system 12. The clutch mechanism 11 is arranged for transmitting torque between an internal combustion engine 13 and a transmission 14, which transmission may be of the conventional synchromesh countershaft type for providing three forward speed ratios and a reverse ratio for driving the drive wheels of an automotive vehicle (not shown). The engine 13 includes a conventional carburetor 15 for supplying fuel to the engine in accordance with the depression of an accelerator pedal 16 through a linkage 17, a lever 18, and another linkage 19 which is connected between the lever 18 and the carburetor 15. The transmission 14 is shifted between its various ratios by means of a shift lever or arm 20 and a shift rod 21 connected to the transmission in a suitable manner (not shown).

The control mechanism 10 includes a pump 22 of any suitable construction and arranged for drawing fluid such as lubricating oil from an oil reservoir or sump (not shown) by means of an inlet passage 23, and for delivering pressurized oil to an outlet chamber 24 located in a casing 25 which also contains the pump 22. The pump 22 is driven by the crankshaft of the engine 13 in any suitable manner (not shown). The pressure chamber 24 is connected at one side to an engine lubrication conduit 26 and at the other side to a control conduit or chamber 27 by means of a port 28 which is arranged to be closed by a lubrication valve 29. The valve 29 is urged to closed position by means of a lightly loaded compression spring 30 which yields and allows the valve 29 to open when a predetermined relatively low pressure has been achieved in the pressure chamber 24. The valve 29 is provided in order that the engine 13 will be supplied with sufficient lubricating oil before any oil is diverted into the control chamber 27.

The clutch mechanism 11 includes a servo mechanism or clutch engaging cyclinder 31 which contains a hydraulically actuatable piston 32. The piston 32 is connected by means of a rod 33 to a pivotal clutch engaging lever 34. A return spring 35 is connected between the lever 34 and the casing of the cylinder 31 and provides means for returning the lever and the piston 32 to unactuated positions when the actuating fluid pressure is relieved. The lever 34 is connected to a movable clutch pressure plate 36, which is arranged for clamping a clutch disc 37 between the plate 36 and a clutch backing plate 38. The clutch plates 36 and 38 are connected for rotation with an engine drive shaft or crankshaft 39 while the clutch disc 37 is splined or otherwise connected for rotation with an input shaft (not shown) of the transmission 14.

The cylinder 31 is fluid connected to the control chamber 27 of the control mechanism 10 by means of a port 40 and a passage 41. As will be seen, the fluid pressure delivered to the chamber 27 will be transmitted to the cylinder 31 to move the piston 32 to the right, which will engage the friction clutch mechanism 11 through counterclockwise pivotal movement of the lever 34. It will be readily understood that the engagement pressure exerted by the clutch plate 36 will vary directly as the pressure of the fluid within the chamber 27.

It should be pointed out that the only passage subject to the time lag associated with the flow of viscous fluid in piping is the passage 41 which is actually made quite short by locating the control body 10 close to or integral with the cylinder 31 so that the port 40 discharges directly into the cylinder 31. All of the other passages between control members handle only a small displacement of air which results in almost instantaneous response.

A control valve assembly 42 is disposed in the casing 25 and controls the flow of oil from the control chamber 27 back to the inlet side of the pump 22. The valve assembly 42 includes a hollow valve body 43 which is axially shiftably disposed in a cylindrical bore 44 formed in the casing 25. A discharge port 45 communicating between the chamber 27 and the inlet side of the pump 22, provides a valve seat for the upper end of the valve body 43 so that when the valve body is in the position shown in Fig. 1, the port 45 is closed. The valve assembly 42 is responsive to pressure in the control chamber 27 and also acts as a pressure relief valve for the pump 22 to prevent the build up of excessive pressures in the engine lubrication system and in the clutch control system.

Thermostatically controlled jet flow means are provided for controlling a limited flow of fluid from the control chamber 27 to the inlet side of the pump 22 when the valve body 43 is in the closed position. Herein such means comprise a jet flow control valve 46 located within the valve body 43 and arranged for controlling flow through a small jet flow orifice 47 communicating with the chamber 27. Fluid flowing from the control chamber 27 into the valve body 43 through the orifice 47 is vented to the inlet side of the pump 22 by means of a plurality of vent apertures 48 formed in the valve body 43 and opening into a discharge chamber 49 formed in the casing 25, which discharge chamber communicates with the inlet side of the pump 22. The jet flow valve 46 is actuated by means of an axially expandable bellows 50 which is also located within the valve body 43. The lower end of the bellows 50 is secured to the valve body 43 while the upper end is secured to the jet flow valve 46. A thermally expandible fluid fills the interior of the bellows so that the bellows expands and contracts axially in response to increases and decreases in temperature, respectively.

The construction and arrangement of the valve 46, the orifice 47, and the bellows 50 is such that the flow through the orifice 47 will be the same regardless of changes in viscosity of the lubricating oil due to changes in the temperature of the oil for any given pressure in the chamber 27. An increase in temperature of the lubricating oil will cause the bellows 50 to expand axially to move the valve 46 closer to the orifice 47 to restrict the flow through the orifice, while a decrease in temperature will cause the bellows to contract to provide a greater effective flow area through the orifice. Thus, the flow rate through the orifice 47 is substantially unaffected by changes in oil temperature so that there will be no alteration of the control characteristics between the period of starting with a cold engine and operation after the engine has warmed up. This jet flow arrangement is substantially in accordance with that shown in my copending applications, Serial No. 79,883, filed March 5, 1949; Serial No. 94,580, filed May 21, 1949; and Serial No. 126,113, filed November 8, 1949.

In order to provide means for actuating the valve assembly 42, actuating mechanism 51 is incorporated. This mechanism includes a flexible diaphragm assembly 52 disposed in a chamber 53 formed in the casing 25 below the chamber 49. The central portion of the diaphragm assembly 52 abuts the lower end of the valve body 43. The diaphragm 52 divides the chamber 53 into a first pressure chamber 54 and a second pressure chamber 55. The chamber 54 communicates with the discharge chamber 49 by means of a passage 56. The chamber 55 is arranged for selective communication with the intake manifold pressure of the engine 13 by means of a duct 57, a valve assembly 58, and a duct 59 which communicates between the valve assembly 58 and a portion of the carburetor 15 downstream of the throttle butterfly valve (not shown). A compression spring 60 is disposed in the pressure chamber 55 and is arranged to urge the central portion of the diaphragm assembly 52, and consequently the valve assembly 42, in a valve closing direction.

The actuating mechanism 51 also includes a second diaphragm assembly 61 which is disposed in another chamber 62 provided in the casing 25 and located in axial alignment below the chamber 53. The diaphragm assembly 61 divides the chamber 62 into a first pressure chamber 63 and a second pressure chamber 64. A compression link 65 is axially shiftably disposed between the two diaphragm assemblies 52 and 61, and a suitable seal (not shown) is provided between the adjoining pressure chambers 53 and 63 about the compression link 65. The pressure chamber 63 communicates with the atmosphere through a passage 66, and the pressure chamber 64 communicates with the intake manifold pressure of the engine 13 by means of a duct 67, a check valve 68, and the duct 59. The check valve 68 is part of the valve assembly 58. A compression spring 69 is disposed in the pressure chamber 64 and acts against the central portion of the diaphragm assembly 61 to urge the valve assembly 42 toward closed position through the link 65.

The construction and arrangement of the actuating mechanism 51 is such that vacuum in the chambers 55 and 64 will tend to urge the respective diaphragm assemblies 52 and 61 in a direction against the action of the compression springs 60 and 69 which provides a closing force acting on the valve assembly 42. Pressure in the chamber 54 tends to urge the valve assembly 42 toward open position in opposition to the springs 60 and 69.

The pressure forces acting within the actuating mechanism 51 are controlled by means of the valve assembly 58 through manipulation of the accelerator pedal 16 and the shift lever 20. The valve assembly 58 includes a valve body 70 having a control chamber 71 therein containing a shiftable valve member 72. The valve member 72 is arranged to close either a vent chamber 73, connected to the atmosphere through a vent port 74, or a vacuum chamber 75, connected with the engine intake manifold pressure through the check valve 68 and the duct 59. As will be seen, when one of the chambers 73 or 75 communicates with the control chamber 71, the other chamber is blocked from communication therewith by means of the valve member 72. In order to enhance the sealing operation of the valve member 72, resilient, rubber-like valve disc faces 76, 76 may be provided.

A compression spring 77 is disposed in the vacuum chamber 75 between the valve member 72 and an annular shoulder 78 formed on a valve actuating rod or link 79. When the accelerator pedal 16 is in the released, throttle closing position as shown, the rod 79 is urged by means of the linkage 17 and the lever 18 into a position for cutting off communication between the vent chamber 73 and the control chamber 71. This is accomplished through the actuating rod 79, which has one end portion adapted for engaging the valve member 72 when the rod is moved toward the right as seen in Fig. 1, by means of a leaf spring 80 secured at one end to the lever 18 and having its free end adapted for abutting the end of the rod 79 opposite to the valve member 72. A hook-like end portion 81 of the lever 18 provides a restraining stop for the free end of the leaf spring 80.

Thus, it will be seen that as the engine throttle is moved toward closed position by release of the accelerator pedal 16, the valve member 72 will be moved toward the right by the increasing compression exerted by the spring 77 through the link 79, the leaf spring 80 and the lever 18. The leaf spring 80 is stronger than the compression spring 77 so that the leaf spring is not flexed when the valve member 72 is held in its right hand position as shown. When the accelerator pedal 16 is in the closed throttle position as shown in Fig. 1, the valve member 72 will cut off communication between the control chamber 71 and the atmosphere, so that the engine intake manifold vacuum will be applied through the duct 59 and the ducts 57 and 67 to the pressure chambers 55 and 64 of the actuating mechanism 51. The application of the relatively low intake manifold pressure to both of these chambers at the same time results in the opening of the control valve assembly 42, so that the fluid pressure in the control chamber 27 is relieved to the inlet side of the pump 22, and the clutch 11 is released by the action of the return spring 35.

Means are provided to insure the venting of the control chamber 71 of the valve assembly 58 to the atmosphere when the shift lever 20 is shifted into the second or third speed positions. In the present instance, such means comprise an element 82 which is disposed in position for urging a compression link 83 to the left as seen in Fig. 1 in order to positively move the valve member 72 into its left hand position for closing the chamber 75 and opening the chamber 73. The lever 82 engages the link 83 whenever the shift arm 20 is shifted into either the second speed position or the third speed position by means of a pair of camming lugs 84, formed at the opposite end of the lever 20 from a hand grip knob 85. As will be readily seen, when the lever 20 is moved toward second speed or third speed position as indicated, one of the camming lugs 84 will move the element 82 into engagement with the link 83 to cause movement of the valve member 72 into its extreme left position. The remainder of the shift leverage (not shown) is arranged so that the camming lugs 84 will not engage the element 82 when the shift arm 20 is moved into its first speed and reverse positions (not shown). The element 82 is resiliently retained in its unactuated position against a pair of stops 86, 86 by means of a pair of tension springs 87, 87 which are secured between the repective opposite ends of the element 82 and a stationary portion of the vehicle.

It will be noted that when the shift lever 20 is in either the second or third speed position, only the pressure chamber 64 of the actuating mechanism 51 will be connected to the engine intake manifold while the pressure chamber 55 will be connected to atmosphere due to movement of the valve member 72 to its extreme left hand position. Thus, the valve assembly 42 will not be opened by the manifold vacuum.

For insuring a smooth engagement of the clutch 11, the throttle linkage 17 is constructed in a manner such that a relatively small movement of the lever 18 will occur in response to the initial movement of the accelerator pedal 16, so that the throttle will be opened fairly gradually and the valve member 72 will move relatively slowly from its extreme right hand position toward its left hand position. For this purpose, the linkage 17 is provided with a compression member 88 which is connected to the accelerator pedal 16 and pivotally secured to one end of a lever 89 which, in turn, is pivotally secured to a stationary portion of a vehicle at 90. The opposite end of the lever 89 is pivotally secured to a link 91 which has its other end pivotally secured to the lower end portion of the lever 18. An adjustable stop 92 is provided to limit movement of the linkage 17 and the accelerator pedal 16 in the throttle closing direction. A throttle return tension spring 93 acts between the lower end of the lever 18 and a stationary portion of the vehicle to return the accelerator pedal to its closed throttle position when the pedal is released. It will be seen that when the accelerator pedal is released, the pivot point between the lever 89 and the link 91 is almost at dead center with respect to the pivot point 90 and the lower end of the lever 18, so that the initial pivoting of the lever 89 in response to the initial depression of the accelerator pedal 16 will move the lever 18 in a counter-clockwise direction at a very slow rate, with the rate increasing as the pivotal joint between the lever 89 and the link 91 moves away from the near dead center position.

The connection between the throttle rod 19 and the lever 18 is provided with a lost motion slot 94 providing for a limited amount of lost motion movement in both directions when the throttle is in the closed position as shown. The purpose of the lost motion is to permit limited movement of the throttle rod 19 in the open throttle direction without corresponding movement of the lever 18 in order to allow for fast idling of the engine 13 without corresponding movement of the valve member 722. Any suitable well known fast idling mechanism, such as that illustrated in Fig. 1A and hereinafter described, may be used in connection with the carburetor 15 for holding the carburetor butterfly valve slightly open and the linkage 19 moved slightly to the left of its Fig. 1 position when the engine 13 is cold. Thus, fast idling of the engine 13 during the warmup period will not cause the vehicle to creep, since the clutch 11 is disengaged as long as the accelerator pedal 16 is released and the shift arm 20 is in any of the first speed, reverse speed or neutral positions. The lost motion slot 94 permits initial movement of lever 18 and rod 79 to allow controlled, initial cluch engagement to be made during fast idle conditions without further increase in engine speed. This facilitates parking maneuvers in close quarters even with engines requiring especially high idling speeds when cold.

While the engine 13 is delivering driving torque through the transmission 14, it would be difficult or impossible to shift from either second or third speed position to any other position if some provision were not made to disengage the clutch. Herein a clutch disengagement provision is incorporated in the form of a lost motion slot 95 formed at the connection between the shift arm 20 and the shift rod 21. An end portion 96 of the rod 21 is disposed in the slot 95 and is centered therein by coaction between a centering spring 97 and a centering lug 98. The spring 97 is held in a substantially axial position by means of the lug 98 and the ends of the spring engage the rod end 96 to normally retain the rod end in a centered position with respect to the shift arm 20, as shown. The centering force exerted by the spring 97 is adjusted so that movement of the shift arm 20 will not move the shift rod 21 until the rod end portion 96 engages one end of the slot 95, so that upon movement of the arm 20 out of either the second or the third speed position, the arm will first be pivoted to allow movement of the valve member 72 to its extreme right hand position, assuming the accelerator is released to render the actuating rod 79 effective, before any movement of the shift rod 21 is effected. Thus, both pressure chambers 55 and 64 of the actuation mechanism 51 are connected to the intake manifold. This results in a disengagement of the clutch 11 before the transmission is shifted so that there will not be any torque locking of the gears and no gear clash will result when the gears are shifted. It will be seen that the accelerator pedal 16 must be released in order to effect a shift from second or third speed, as well as from first speed or reverse, in order that the valve member 72 will be urged to the right when the force on the link 83 is released by initial movement of the shift lever 20.

A second embodiment of the shift arm connection to the valve assembly 58 is shown in Fig. 2. In this embodiment, a shift arm 100 is arranged to pivot about a pin 101 in order to effect movement of a shift rod 102. A lost motion and centering arrangement is provided similar to that shown in Fig. 1 by means of a lost motion slot 103, a centering spring 104 and a centering lug 105. Connection between the shift arm 100 and the compression link 83 of the valve 58 in this embodiment is provided through a Bowden wire assembly 106 connected to the link 83 and a cam lever 107 pivotally secured to the shift arm 100 at 108. The cam lever 107 is connected to the other end of the Bowden wire assembly 106 and is provided with a rotatable cam follower 109 which rides on a cam 110, fixedly secured to the vehicle, as the shift arm 100 is moved. When the shift arm 100 is moved to either of the first speed or reverse drive positions (not shown), no relative movement between the cam lever 107 and the shift arm 100 occurs so that the Bowden wire assembly 106 does not cause any movement of the link 83. However, when the shift arm 100 is moved into either the second or the third speed position, one of a pair of cam lifts 111, 111 is engaged by the cam follower 109, resulting in pivoting of the cam lever 107 in a counter-clockwise direction relative to the shift arm 100, so that the compression link 83 is moved toward the left, to open communication between the vent chamber 73 and the pressure chamber 71 and to close the vacuum chamber 75.

The check valve 68 of Fig. 1 is provided in order to insure rapid disengagement of the clutch 11 in response to closing of the throttle and manipulation of the shift lever. It will be seen that at the instant the valve member 72 moves to its extreme right hand position, a ball check member 112 of the check valve will be moved toward open position against the bias of a compression spring 113 in order to almost instantly equalize the pressure in the chamber 55 of the actuating mechanism 51 with that in the engine intake manifold. Also, the valves 68 will open in response to sudden increases in vacuum due to a sudden release of the accelerator pedal 16, in order to equalize the pressure within the pressure chamber 64 with that in the engine intake manifold. It will be understood that a very fast disengagement of the clutch 11 is desirable in order that the transmission may be readily and speedily shifted. However, it is not desirable to suddenly reengage the clutch 11 due to an increase in absolute pressure in the engine manifold when the throttle is opened. Therefore, a restricted by-pass bleed 114 is formed in the valve 68 around the ball check member 112 so that when the ball check member seats due to an increase in the intake manifold pressure, this increased pressure must bleed fairly slowly through the bleed 114 in order to increase the pressure in the pressure chamber 64, and in the pressure chamber 55 when the valve member 72 is in its right hand position. Thus, the check valve 68 provides for very fast disengagement of the clutch 11, but insures relatively slow reengagement.

Manual lockout means are provided in order to allow manual engagement of the clutch 11 when desired. Such means are the form of a lockout button 115 which may be placed on the vehicle dashboard or in any other position accessible to the driver. The button 115 is connected to a lever 116 by means of a linkage 117. The lever 116 may be pivotally secured to the clutch apply lever 34 in a manner such that pulling the lockout button 115 will cause pivoting of the lever 116 and the clutch apply lever 34 in a clutch engaging direction. It will be readily seen that this lockout arrangement is useful at times when the engine 13 is inoperative, such as when the vehicle is being pushed in order to start the engine. The lockout may also be used in order to use the engine as a brake in case of failure of the power clutch system.

The fast idle arrangement that may be used in connection with the carburetor 15 is illustrated in Fig. 1A and includes an automatic choke comprising a choke butterfly valve 242 located upstream of the throttle butterfly valve and adapted for being closed by a spring thermostat 243 which acts to open the choke butterfly when the vehicle engine has warmed up. The fast idle arrangement comprises a fast idle cam 244 secured to the choke butterfly 242 and adapted for engaging a fast idle linkage 245 secured to an arm 246 which is fastened to the throttle butterfly 227 and to which is fastened the linkage 19. The fast idle cam 244 is provided with cam plate 247 adapted for engaging the fast idle linkage 245 when the choke butterfly 242 is in the closed or partially closed position in order to partially open the throttle butterfly 227 to produce fast idle at the same time that the engine is being choked. The arrangement is such that, when the choke butterfly 242 is fully opened, the fast idle cam allows the throttle butterfly 227 to close completely if the accelerator pedal 16 is released. A choke relief bypass valve 248 is provided in the choke butterfly 242 to prevent air starvation of the engine when the choke butterfly is closed.

In operation of the automatic clutch system described thus far, fluid pressure for engaging the clutch 11 is generated by the pump 22, and this pressure is supplied to the clutch engagement servo mechanism 31 by means of the port 28, the control chamber 27, the port 40, and the duct 41. The engaging pressure supplied to the servo mechanism 31 is controlled by the control valve assembly 42 in accordance with the pressure differentials across the diaphragm assemblies 52 and 61 and the pressure within the control chamber acting against the upper end of the valve assembly 42, and in conjunction with the compression forces exerted by the springs 60 and 69. The engaging pressure will vary in accordance with the torque being supplied by the engine 13 since an increase in engine torque is manifested by an increase in the engine manifold pressure (or decrease in manifold vacuum) which is supplied to the pressure chamber 64. Thus, a high engine torque will result in a pressure in the chamber 64 close to atmospheric, so that substantially the entire effort of the spring 69 will be employed in holding the valve assembly 42 in the closed position. A decrease in engine torque will result in a decreased pressure in the chamber 64 to counteract some or all of the effect of the spring 69 to decrease the closing effort exerted on the valve assembly 42 to allow fluid pressure from the control chamber 27 to be more readily bypassed to the inlet side of the pump 22, resulting in a decreased engaging pressure for the clutch 11. It will be readily seen that this is a very desirable feature in that the clutch will be engaged by a greater force when a greater engagement force is required such as when a greater amount of torque is being transmitted from the engine 13 through the clutch 11 and the transmission 14 to the vehicle driving wheels. However, even when the accelerator pedal 16 is completely released, the clutch 11 will not be disengaged if the shift arm 20 is in either the second or third speed position, since the chamber 55 will be supplied with atmospheric pressure, and the low pressure within the chamber 64 serves merely to neutralize the effect of the spring 69 rather than to cause opening of the valve assembly 42. Thus, a lighter engaging force will still be applied to the clutch 11 so that the engine is available as a brake when the accelerator pedal 16 is released in either second or third speed. This substantially reduced engaging pressure exerted on the clutch 11 is still sufficient to prevent clutch slippage when the engine is used as a brake.

The control system 12 is constructed so that movement of the shift arm 20 (or the shift arm 100 in the embodiment of Fig. 2) to either the second or third speed position will overrule the operation of the lever 18 tending to close the chamber 73 and will cause flexing of the leaf spring 80. The clutch 11 remains engaged in the second and third speed conditions regardless of release of the accelerator pedal 16, so that the engine may be used as a brake. The provision of the lost motion slot 95 in the shift arm 20 (and the lost motion slot 103 in the shift arm 100 of Fig. 2) permits shifting from either the second or the third speed position of the shift arm 20 into any other position by first allowing the valve member 72 to close the vent chamber 73, through actuation by the rod 79, so that the clutch 11 is disengaged before any actual gear shifting occurs.

Limited movement of the throttle rod 19 in the open throttle direction, during the automatic fast idle during engine warm-up, will not affect the position of the valve member 72 because of the provision of the lost motion slot 94 in the lever 18. Further, when the engine is operating at fast idle, the lost motion slot 94 permits a limited initial movement of the accelerator pedal and the lever 18 to allow a limited, gradual movement of the valve member 72 toward the left, which provides a gradual build up of pressure in the chamber 55. This provides for gradual engagement of the clutch without additional engine acceleration to permit maneuvering of the vehicle on fast idle and to prevent a more sudden engagement at a higher engine speed.

The provision of the initial slow moving leverage 17 insures a more gradual initial movement of the valve member 72 and, consequently, a smoother clutch engagement. The check valve 68 provides for quick clutch disengagement by movement of the ball check 112 off of its seat but prevents fast reengagement due to seating of the ball 112 and relatively slow bleeding of the increased manifold pressure through the passage 114.

The provision of the jet flow orifice 47 in the valve assembly 42, the jet flow valve 46, and the bellows 50 provides for smooth initial clutch engagement when the vehicle is started in first or reverse. Since the pressure drop through an orifice varies directly as the square of the flow rate therethrough, and since the pump 22 tends to increase the flow delivered to the control chamber 27 directly with increase in engine speed, the jet flow orifice 47 will modulate the pressure increase in the control chamber 27 in a manner such that the increase in engagement pressure transmitted to the servo mechanism 31 will vary approximately in proportion to the square of the engine speed, so that the effect is almost identical in clutch engagement with an arrangement of a centrifugal valve for controlling clutch engagement pressure. Thus, the engine cannot stall and cannot run too fast when the orifice 47 is properly calibrated. The temperature sensitive bellows 50 insures that this jet flow clutch engagement principle will be consistent regardless of any change in temperature of the lubricating oil resulting in a change in viscosity. In addition, the slow acting throttle linkage 17 insures a more gradual increase in pressure in the central chamber 27. As a result, a fully automatic, substantially torque responsive start is provided with maximum simplicity of control and construction.

In Fig. 3 is illustrated another embodiment of the automatic clutch control system of this invention. In this embodiment a pressure control mechanism 119 is included which is very similar to the pressure control mechanism 10 of Fig. 1. The mechanism 119 includes a casing 120 which contains an engine driven pump 121; a pressure chamber 122; a lubrication valve 123; a control chamber 124; a discharge port 125; and a control valve assembly 126 including a jet flow orifice 127, a jet flow control valve 128, and a temperature sensitive bellows 129; all identical to the corresponding portions of the pressure control mechanism 10. A duct 130 connects the port 125 with a clutch engagement servo mechanism 131 similar to the mechanism 31 of Fig. 1. The clutch, engine, and transmission are not shown in the interest of simplicity of presentation, but it will be understood that the arrangement of Fig. 1 may be utilized.

The pressure control mechanism 120 is provided with a single diaphragm type valve actuating mechanism 132. The actuating mechanism 132 includes a single diaphragm assembly 133 disposed in a chamber 134 provided in the casing 120. The diaphragm assembly 133 divides the chamber 134 into a first pressure chamber 135 and a second pressure chamber 136. The valve assembly 126 is fixedly secured to the central portion of the diaphragm assembly 133, and a compression spring 137 disposed in the pressure chamber 136 acts against the diaphragm assembly to urge the valve assembly toward a closed position against a valve seat provided by a relief port 138. The pressure chamber 135 is vented to a pressure relief chamber 139 formed in the casing 120 and communicating with the inlet side of the pump 121. The pressure chamber 134 communicates with an engine carburetor 140 through a duct 141, a check valve 142, and an orifice 143. The orifice 143 is formed in the barrel of the carburetor 140 downstream of a throttle butterfly valve 144, so that the chamber 136 is actually in communication with the engine intake manifold pressure.

Control means are provided for controlling the magnitude of the vacuum in the pressure chamber 136. Such means comprise a vacuum limit valve 145, a throttle control valve 146, and a shift control valve 147. The vacuum limit valve 145 is connected to the duct 141 between the chamber 136 and the check valve 142 by means of a duct 148. The valve 145 comprises a ball check member 149 adapted to close a port 150 under the influence of a compression spring 151.

The valves 146 and 147 are connected in parallel by means of a duct 152 and communicate with the valve 145 through the port 150 by means of a duct 153. The throttle control valve 146 comprises a ball check member 154 adapted for closing a port 155, communicating with the atmosphere, under the influence of a compression spring 156. The force exerted by the spring 156 is variable by means of a slidable element 157 which abuts the opposite end of the spring 156 from the ball check member 154. The element 157 has a lug 158 extending axially of the valve 146 in position for engagement by a throttle lever 159 which, in turn, is fixedly secured to the butterfly valve 144. When the butterfly valve is in the closed throttle position, the lever 159 engages the lug 158 to move the element 157 to the left to cause the spring 156 to resiliently urge the ball check member 154 into closing relation with the port 155. When the butterfly 144 is in a position other than the closed throttle position so that the lever 159 does not engage the lug 158, the element 157 moves to its extreme right hand position as shown, and the spring 156 allows the ball check member 154 to uncover the port 155.

The throttle butterfly valve 144 is operated by means of an accelerator pedal 160 which is connected to the throttle lever 159 by means of a suitable linkage 161. If desired, the slow opening linkage 17 of Fig. 1 can be utilized as is illustrated in Fig. 3A.

The valve 147 comprises a ball check member 162 adapted for closing a port 163, communicating with the atmosphere, under the influence of a compression spring 164. A lever 165 is pivotally secured to a stationary portion of the vehicle by means of a pivot pin 166. A compression link 167 is disposed between the ball check member 162 and the lower end portion of the lever 165 so that pivoting of the lever in a clockwise direction urges the link 167 to the left to unseat the valve member 162 and to open the port 163. The opposite end portion of the lever 165 is adapted to be engaged by a portion of a shift arm 168 whenever the shift arm is moved to the high or third speed position, so that when the transmission is shifted to high, the ball check member 162 will be unseated and atmospheric pressure will be admitted into the ducts 152 and 153. The shift arm 168 is adapted for shifting the transmission through a shift rod 169.

For allowing shifting from high speed position to any other position of the shift arm 168, lost motion means are provided between the shift arm and the shift rod 169. In the present instance, such means comprise a deformable rubber grommet 170 disposed about an end lug 171 formed on the rod 169. The grommet 170 is retained within an aperture 172 formed in an end portion 173 of the shift arm 168. The construction and arrangement of the grommet 170 and the associated linkage is such that initial movement of the shift arm 168 will first disengage the end portion 173 from the lever 165 to allow closing of the port 163 of the valve 147 by means of the ball check member 162 before the shift rod 169 is moved to shift the transmission.

Lockup means are provided for manually opening the valve 147 in an emergency. For this purpose, a lockup knob 174 is disposed in a position accessible to the vehicle driver and a linkage 175 is provided between the knob and the upper portion of the lever 165. Thus, pulling the lockup knob 174 to the right will pivot the lever 165 in a clockwise direction to open the valve 147 through the compression link 167.

The check valve 142 comprises a ball check member 176 adapted for closing a port 177, communicating with the duct 141, under the influence of a compression spring 178. A small by-pass notch 179 is formed in the port 177 and performs the same function as the by-pass passage 114 in the check valve 68 of Fig. 1. The check valve 142 functions in a manner similar to the check valve 68 to allow a rapid decrease of pressure within the chamber 136, but closes to insure a relatively slow increase in pressure in the chamber by bleeding through the notch 179. Thus, the clutch will be disengaged quickly but the reengaging pressure will be exerted relatively slowly.

In this embodiment of Fig. 3, manual means are provided for disengaging the clutch in order to prevent vehicle creep under fast idle condition. To this end a manual overrule button 180, which may be located on the vehicle floor in the driver's compartment, is connected by a linkage 181 to a compression strut 182 having a lower end portion 183 abutting the top end of the valve assembly 126. The button 180 is resiliently held in its unactuated position by means of a compression spring 184 which urges a stop shoulder 185 into engagement with a stationary portion of the vehicle. The lower end portion of the button 180 abuts the end portion of one arm of a bell crank lever 186 which is pivotally secured to the stationary portion of the vehicle by means of a pivot 187. The other arm of the bell crank lever 186 is pivotally secured to one end of a compression link 188 which, in turn, has its other end pivotally secured to a rockable arm 189. The arm 189 is provided with a semi-circular cam lug 190 which has a flat cam surface 191 adapted for engaging the top end of the rod 182 when the arm 189 is pivoted in a counter-clockwise direction due to depression of the button 180, in order to move the rod 182 and the valve assembly 126 downwardly to open the port 138 and to relieve the pressure within the control chamber 124. Thus, depression of the floor button 180 causes release of the clutch engagement pressure and disengages the clutch.

In operation of the automatic clutch control arrangement shown in Fig. 3, the vehicle engine drives the pump 121 to generate pressure for lubricating the engine and for applying clutch engaging pressure to the clutch servo mechanism 131 through the duct 130, the port 125, and the control chamber 124. When the shift arm 168 is in any position other than third speed and when the accelerator pedal 160 is released, both of the valves 146 and 147 are closed and full manifold vacuum is exerted in the pressure chamber 136. This full manifold vacuum is sufficient to cause downward movement of the diaphragm assembly 133 against the compression of the spring 137 to open the valve assembly 126 so that the pressure in the control chamber 124 is relieved and the clutch is disengaged. When the accelerator pedal 160 is depressed in order to start the vehicle in first, second, or reverse, the valve 146 opens because of the movement of the element 157 to its extreme right hand position to relieve the compression of the spring 156. Thus, atmospheric pressure is admitted to the duct 153. The valve 145 is constructed so that it will open partially under such circumstances to raise the pressure in the ducts 148 and 141 to provide a pressure in the chamber 136 in between the manifold vacuum pressure and atmospheric pressure; so that the pressure differential across the diaphragm assembly 133 will be decreased, and the valve assembly 126 will close under the influence of the spring 137. In other words, the action of the valve 145 alone is not sufficient to maintain the clutch disengaged in conjunction with the diaphragm assembly 133 because the strength of the spring 151 is not sufficient to hold the valve member 149 fully seated against a pressure differential of atmospheric pressure in the duct 153 and full manifold vacuum in the duct 148 and the chamber 136. Complete disengagement is obtained only when both of the valves 146 and 147 are closed. Thus, when the accelerator pedal 160 is depressed, or at any time when the shift arm 168 is in the third speed position, the vehicle clutch will be engaged by a pressure which varies directly as the pressure in the engine intake manifold, so that the clutch engagement pressure may be said to vary substantially as the torque output of the engine as is the case with the first embodiment when atmospheric pressure is exerted in the pressure chamber 55.

The resilient bushing 170 in the shift arm 168 performs substantially the same function as the lost motion means provided in the shift arms 20 and 100 of Figs. 1 and 2. When the shift arm 168 is moved initially in order to shift from high speed position to any other speed, the initial movement first allows the valve 147 to close to disengage the clutch when the accelerator pedal 160 is released, and then further movement of the shift arm moves the shift rod 169 to affect the gear shift.

If it is desired to maintain the clutch engaged in any gear ratio other than third, the lockup button 174 may be pulled to open the valve 147 to engage the clutch even though the throttle is closed. Thus, the engine can be used as a brake in any gear ratio.

In order to maintain the clutch disengaged regardless of release of accelerator pedal 160, the floor button 180 is depressed to open the valve 126 and to relieve the pressure within the control chamber 124. Hence, vehicle creep can be prevented manually when the throttle butterfly 144 is opened partially in the fast idle condition during engine warmup.

In Fig. 4 is shown another embodiment of the invention in which is provided a pressure control mechanism 200 having a body portion or a casing 201. The pressure control mechanism 200 is identical to the pressure control mechanism 10 as shown in Fig. 1 except for the substitution of a different actuating mechanism 202, in place of the actuating mechanism 51 of the first embodiment. The pressure control mechanism 200 includes an engine driven pump 203, a lubrication valve 204, a control chamber 205, a port 206, a relief port 207, a control valve assembly 208 adapted for closing the port 207, and a pressure relief chamber 209, all identical to the corresponding portions of the pressure control mechanism 10. A clutch actuating servo motor 210, is connected to the port 206 by means of a duct 211. It will be understood that the engine, clutch, and transmission arrangement may be similar to that shown in Fig. 1.

The actuating mechanism 202 of this embodiment comprises an electrical solenoid 212, having a body portion 213 fixedly secured to the casing 201 below the valve assembly 208 and providing a chamber 214 between the solenoid and the control mechanism casing. A flexible diaphragm assembly 215 is disposed in the chamber 214 with its peripheral edge portion clamped between the casing 201 and the upper end portion of the solenoid body 213 to divide the chamber 214 into a first pressure chamber 216 and a second pressure chamber 217. The valve assembly 208 is fixedly secured to the central portion of the diaphragm assembly 215. A solenoid armature 218 is fixedly secured to the central portion of the diaphragm assembly 215 on the opposite side of the valve assembly 208 and is adapted to be drawn downwardly when electrical current is supplied to a solenoid winding 219 through a pair of connections 220, 220. A compression spring 221 is disposed between the central portion of the diaphragm assembly 215 and the solenoid winding 219. The pressure chamber 216 is connected to the relief chamber 209 by means of passage 222. The pressure chamber 217 is connected to the intake manifold pressure by means of a duct 223, a connecting duct 224, and an orifice 225 which is formed in the barrel of an engine carburetor 226 downstream of a throttle butterfly valve 227. A vacuum limit valve 228, which performs the same functions as the valve 145 of the Fig. 3 embodiment, is connected to the duct 223 and comprises a ball check member 229 resiliently urged toward closing relation to a port 230 by means of a compression spring 231. A valve 232 communicates with the valve 228 through the port 230 by means of a duct 233. The valve 232 comprises a ball check member 234 adapted for resiliently closing a port 235, communicating with the atmosphere, under the influence of a compression spring 236.

The compressive force exerted by the spring 236 is controlled by means of a throttle lever 237 which is actuated by means of an accelerator pedal 238 through a linkage 239. The lever 237 is provided with an arm 240 which is adapted to engage a shiftable element 241 in the valve 232 and to move the element upwardly when the accelerator pedal 238 is released. The spring 236 is disposed between the ball check member 234 and the element 241 so that upward movement of the element compresses the spring and closes the port 235, which is open when the shiftable element is in its downward position.

An automatic choke and fast idle arrangement, similar to that shown in Fig. 1A, is provided and includes an automatic choke comprising a choke butterfly valve 242, located upstream of the throttle butterfly valve 227 and adapted for being closed by a spring thermostat 243, which acts to open the choke butterfly when the vehicle engine has warmed up. The fast idle arrangement comprises a fast idle cam 244 secured to the choke butterfly 242 and adapted for engaging a fast idle linkage 245 secured to an arm 246 which is fastened to the throttle butterfly 227. The fast idle cam 244 is provided with cam lifts 247 adapted for engaging the fast idle linkage 245 when the choke butterfly 242 is in the closed or partially closed position in order to partially open the throttle butterfly 227 to produce fast idle at the same time that the engine is being choked. The arrangement is such that when the choke butterfly 242 is fully opened, the fast idle cam allows the throttle butterfly 227 to close completely if the accelerator pedal 238 is released. A choke relief by-pass valve 248 is provided in the choke butterfly 242 in order to prevent air starvation of the engine when the choke butterfly is closed.

In order to prevent movement of the throttle lever 237 when the throttle butterfly 227 is moved by the fast idle cam, lost motion means are provided between the throttle butterfly and the throttle lever. Such means comprise a pivotal connection 249 between the lever 237 and the butterfly 227 and a one-way engagement connection 250 in the form of an abutment lug 251 formed on the lever 237 and an adjustable abutment screw 252, threadably inserted through a portion 252 of the arm 253 and adapted for engaging the lug 251. Return spring means (not shown) may be provided for urging the butterfly 227 toward closed position. It will be seen that partial opening of the throttle butterfly 227 by means of the fast idle cam 244 will not cause movement of the throttle lever 237 since the screw 252 will move from engagement with the abutment lug 251. However, depression of the accelerator pedal 238 will cause counter-clockwise pivoting of the lever 237 to engage the screw 252 and the lug 251 to cause opening of the throttle.

For causing opening of the valve 232 when the vehicle engine has warmed up, an arm 254 is secured to the choke butterfly 242 and is provided with a hook-like end portion 255 adapted for engaging the ball check member 234 and urging the same downwardly against the compression of the spring 236 when the engine has warmed up and the choke butterfly 242 is moved to the open position. Thus, release of the accelerator pedal 238 will not cause the valve 232 to close when the vehicle engine has warmed up, because of the action of the arm 254.

Means are provided for shifting the transmission gears and also for automatically disengaging the vehicle clutch immediately prior to any gear shift. To this end, a gear shift arm 256 is pivotally secured to a stationary portion of the vehicle at 257 and is adapted for shifting transmission through movement of a shift rod 258 which is pivotally secured at 259 to a lost motion yoke 260. The shift arm 256 includes a contact 261 electrically connected to one of the solenoid connections 220 by means of a lead wire 262. A pair of contacts 263, 263 are secured to the lost motion yoke 260 in spaced relation on opposite sides of the contact 261. The contacts 263 are interconnected by means of a wire 264 and are connected to the other solenoid connection 220 through a ground connection and a lead wire 265 which connects a pair of normally closed switches 266, 266, the vehicle ignition switch 267 and the vehicle battery 268, all in series between the contacts 263 and the solenoid 212. Centering springs 269 are provided for holding the yoke 260 in a centered position with respect to the shift arm 256 so that the contacts 263 normally are separated from the contact 261. The arrangement is such that initial movement of the shift arm 256 in order to shift from any gear ratio to any other gear ratio will cause contact of one of the contacts 263 with the contact 261 to complete an electrical circuit to the solenoid 212 to cause movement of the armature 218 and the valve assembly 208 downwardly to relieve the pressure in the control chamber 205 to disengage the vehicle clutch. After the clutch has been disengaged, continued movement of the shift arm 256 causes a gear shift through movement of the shift rod 258. The switches 266 are provided so that there will be no lag in clutch reengagement after a shift has been completed.

One of the switches 266 will be opened by the yoke 260 after the shift is completed to break the clutch disengagement circuit and to allow the clutch to reengage even though the driver maintains a pressure on the shift arm 256.

In operation of the clutch control arrangement shown in Fig. 4, fluid pressure is supplied by the pump 203 to the control chamber 205, and the magnitude of this pressure is controlled in accordance with the position of the control valve assembly 208. During continuous operation in one gear ratio, the engaging pressure applied to the clutch varies substantially directly with the absolute pressure in the intake manifold because of the balance of pressure forces and spring force acting on the diaphragm assembly 215 in the same manner as the previous embodiments. Vehicle creep under fast idle condition is prevented by providing the two check valves 228 and 232, so that when both valves are closed, the full manifold vacuum is supplied to the chamber 217 to move the valve assembly 208 downwardly to relieve the engaging pressure of the vehicle clutch. When the vehicle engine has warmed up sufficiently, the valve 232 will be held open, but since the vehicle engine is no longer operating under fast idle condition when the engine has warmed up, the tendency of the vehicle to creep will be very much diminished since the jet flow orifice is sufficient to take care of the reduced fluid flow from the pump without allowing a pressure rise in the control chamber 205 sufficient to engage the clutch, even though the action of the check valve 228 alone is not sufficient to unseat the valve assembly 208. The provision of the lost motion connection on the throttle valve allows the throttle valve to open under fast idle conditions without concurrent movement of the throttle lever, so that the valve 232 remains closed as long as the accelerator pedal is released and the engine has not warmed up sufficiently to allow the arm 254 to hold the valve 232 open.

The provision of a relatively small orifice 225 for bleeding the manifold vacuum pressure into the pressure chamber 217 insures a relatively slow reengagement of the clutch, as was the case with the previous embodiment. At the same time the orifice prevents the engine from idling roughly due to the introduction of an excessive amount of air into the carburetor barrel after the valve 232 has opened and only the valve 228 restricts the flow of atmospheric air into the duct 224.

The clutch control of Fig. 4 provides an electrical system for automatically disengaging the clutch when the shift arm is moved to shift the transmission to another gear ratio. The arrangement is such that the initial movement of the gear shift arm energizes the clutch disengagement solenoid due to closing of the electrical contacts, and then subsequent movement of the gear shift arm actually shifts the transmission gears to provide the next gear ratio while the clutch is disengaged. When the gear shift arm is released after the shift has been completed, the springs 269 center the arm with respect to the yoke 260 so that the contacts are separated and the solenoid is disengaged to allow reengagement of the clutch. If the shift arm is not released, one of the switches 266 opens to break the clutch disengagement circuit.

A further embodiment of the invention is illustrated in Fig. 5. In this embodiment, an engine driven pump 280 is arranged for supplying fluid under pressure to a pressure control mechanism 281 having a casing or body 282. Fluid pressure is delivered from the pump 280 to an inlet port 283 of the casing 282 by means of a duct 284. A lightly spring loaded lubrication valve 285 is provided for closing the port 283 until a predetermined minimum lubrication pressure has been achieved in order to assure proper lubrication of the vehicle engine before engaging pressure is supplied to the clutch, as was the case with the previous embodiments. Fluid which passes the lubrication valve 285 enters a control chamber 286 formed in the casing 283 and communicating with a clutch engagement cylinder 287 by means of a duct 288. A bypass or pressure relief port 289, communicating with the inlet side of the pump 280 by means of a duct 290, is normally closed by means of a control valve 291.

In this embodiment, the jet flow control arrangement is not formed within the control valve itself, but is separate in the form of a jet flow orifice 292 communicating between the pressure control chamber 286 and a relief chamber 293. A jet flow control device 294 includes a valve 295 having a portion 296 adapted for restricting flow through the jet flow orifice 292. The position of the valve 295 is controlled by means of a washer-type thermostat 297 and a solenoid 298. The solenoid 298 includes a casing 299 which is secured to the control mechanism casing 282, forming a chamber 300 therebetween. The chamber 300 contains the thermostat 297 and is vented to the relief chamber 293 by means of a passage 301. A chamber 302 behind lubrication valve 285 is vented to the chamber 300 by means of an aperture 303.

The thermostat 297 is adapted to move the valve 295 toward a closed position in response to an increase in temperature of the lubricating oil, and similarly the thermostat will move the valve toward a more open position in response to a decreased temperature of the oil so that the pressure drop characteristics of the jet flow orifice will remain substantially constant regardless of changes in temperature.

Actuating mechanism 304 is provided in order to control the position of the control valve 291. The actuating mechanism includes a diaphragm assembly 305 disposed in a chamber 306 formed in the casing 282 and dividing the chamber to a first pressure chamber 307 and a second pressure chamber 308. The pressure chamber 307 is vented to the relief chamber 293 by means of a passage 309, and the chamber 306 is connected to the intake manifold of the vehicle engine by means of a duct 310. The valve 291 is fixedly secured to the central portion of the diaphragm assembly 305 so that the valve will move in response to changes in pressure differential across the diaphragm assembly. A restricting orifice 311 is provided to the duct 310 to perform the same function as the orifice 225 of Fig. 4. A double compression spring arrangement 312 is disposed between the central portion of the diaphragm assembly 305 and an adjustable spring seat member 313 which is secured to the upper end of an adjustable bolt 314 which is threadably inserted through a portion of the casing 282. As will be seen, adjustment of position of the spring seat 313 may be made by means of bolt 314 in order to change the control characteristics of the valve 291.

A vacuum limit check valve 315 is connected to the pressure chamber 308 by means of a duct 316. The valve 315, which performs the same functions as the valve 145 of the Fig. 3 embodiment and the valve 228 of the Fig. 4 embodiment, comprises a ball check member 317 adapted for closing a port 318 by means of a compression spring 319. The port 318 communicates with a duct 320 which connects a thermostatically controlled valve 321 and an accelerator controlled valve 322 in parallel. The valve 321 comprises a ball check member 323 adapted for closing a port 324, communicating with the atmosphere, under the influence of a compression spring 325. The spring 325 is adapted to be overruled by means of a thermostat assembly 326, which includes a spring thermostat 327 secured at 328 to a stationary portion of the vehicle and having an arm 329 secured at its other end. The thermostat 327 may be the same as the thermostat 243 of Fig. 4 or may be a separate thermostat under the influence of the same engine temperatures so that the arm 329 will assume the position shown in solid lines when the engine is cold and the position shown in dotted lines when the engine is warm. An abutment screw 330 is threadably inserted through the free end portion of the arm 329 so that the lower end of the screw will engage the ball check member 323 to move the same away from the port 324 to allow atmospheric pressure in the duct 320 when the engine is warmed up and the arm is in the hot position.

The valve 322 comprises a ball check member 331 adapted for closing a port 332, communicating with the atmosphere, under the influence of a compression spring 333. The spring 333 is disposed between the ball check member 331 and a spring seat element 334 having a post portion 335 engaged by a spring pressed lever 336. The lever 336 is connected to the vehicle accelerator pedal 337 by means of a linkage 338. The arrangement is such that when the accelerator pedal 337 is released, the lever 336 moves the element 334 upwardly to compress the spring 333 and to close the port 332. When the accelerator pedal 337 is compressed, the compression of the spring 333 is relieved and the valve 322 opens to allow atmospheric pressure into the duct 320.

Means are provided for automatically disengaging the vehicle clutch immediately prior to shifting gears in the transmission. Herein such means comprise a push-type solenoid 339 having an armature 340 engaging a compression link 341 which has a lower end portion engaging the valve 291 in position for opening the valve when the solenoid 339 is energized. The solenoid 339 is connected to the ground through a connection 342 and a wire 343. A shift lever arrangement 344 is provided which may be identical to the arrangement shown in Fig. 4. The shift control arrangement includes a shift arm 345 having a central contact 346 connected to the vehicle battery 347 by means of a lead 348, with the battery being connected to the ground by means of a lead 349. A pair of spaced contacts 350, 350 are provided on a yoke 351 and these contacts are connected to a connection 352 of the solenoid 339 by means of a lead 353. The shift control arrangement 344 operates in an identical manner with the shift control arrangement shown in Fig. 4 to disengage the vehicle clutch upon initial movement of the shift arm 345 while further movement of the arm results in shifting of the transmission through a shift rod 354.

In the present embodiment, means are provided for closing the jet flow orifice 292 under certain conditions of operation to provide greater engagement pressure for the vehicle clutch and to cut down on power losses occasioned by continual pumping through the orifice. Such means comprise the solenoid 298 in conjunction with a shift arm controlled switch 355 which is connected in series with a brake controlled switch 356. The switch 355 is normally opened and comprises a contact 357 connected to a connection 358 of the solenoid 298 and a contact 359, with the contacts adapted to be bridged by means of a member 360. The member 360 is moved into bridging contact across the contacts 357 and 359 when the shift arm 345 is moved into third speed position by means of a lever 361 which is connected to the shift arm by means of linkage not shown. The switch 356 comprises a contact 362 connected to the contact 359 of the switch 355 and a contact 363 which is connected to the battery lead 348. The contacts 362 and 363 are normally bridged by means of a member 364 which is adapted to be engaged by a vehicle brake lever 365 to open the contacts whenever the brakes are applied. A connection 366 of the solenoid 298 is connected to the ground so that when a circuit is completed between the connections 358 and 366 such as when the vehicle is shifted into third and the brake pedal is released, an armature 367 of the solenoid moves the valve 295 to a closed or substantially restricted position to prevent or restrict flow through the jet flow orifice 292, so that substantial engaging pressure will be applied to the vehicle clutch even at low vehicle speeds. The switch 356 is provided to deenergize the solenoid 298 when the brake is applied so that the vehicle may be brought to a complete stop without stalling the engine even though the shift arm 345 remains in the third speed position.

In operation of the embodiment shown in Fig. 5, fluid pressure for engagement of the vehicle clutch is supplied by means of the pump 280 to the control chamber 286 to apply the clutch through operation of the clutch engagement cylinder 287. The engagement pressure is generally responsive to the torque transmitted by the vehicle engine through the control valve 291, the diaphragm assembly 305, the manifold connection duct 310, the spring arrangement 312, and the vacuum limit valve 315. The initial clutch engagement pressure builds up substantially as the square of the engine speed through action of the jet flow orifice 292 in connection with the jet flow valve 295 and the thermostat 297. Creeping of the vehicle due to fast idling of the vehicle engine during warm-up is prevented by means of the thermostatically controlled valve 321 and the accelerator controlled valve 322 since when both of these valves are closed at the same time, full intake manifold pressure is provided in the pressure chamber 308 which causes opening of the valve 291 to disengage the vehicle clutch. When the valve 321 is opened, the valve 315 alone is not sufficient to maintain the clutch disengaged so that free wheeling of the engine is prevented and the engine is available for use as a brake even though the accelerator 337 is completely released to close the valve 322. The clutch is disengaged by energizing the solenoid 339 when the shift arm 345 is moved initially in order to shift to another gear ratio. The provision of the switch 355 insures a greater clutch engaging pressure when the vehicle is shifted into the third speed position through action of the solenoid 298, while the switch 356 provides for de-energization of the solenoid 298 whenever the vehicle brake is depressed even though the vehicle shift arm remains in the third speed position.

From the above description, it will be readily understood that the present invention provides improved and simplified means for automatically controlling engagement and disengagement of a vehicle clutch so that the vehicle may be driven and shifted semi-automatically. The arrangement in all of the embodiments is such that the clutch engagement pressure is maintained substantially in proportion to the amount of torque transmitted by the engine so that increased torque will not cause a slipping of the clutch. The engine is available as a brake in all of the embodiments even though the accelerator pedal is completely released. In most of the embodiments automatic means are provided for preventing vehicle creep under fast idle conditions, while in one of the embodiments manual means are provided for such purpose. The jet flow principle is utilized for providing initial clutch engagement which increases as the square of the increase in engine speed to insure smooth clutch engagement without danger of the engine stalling or overspeeding. The arrangement in all of the embodiments is such that the installation can be made very inexpensively through the use of a conventional countershaft transmission.

It will be understood that modifications and variations may be effected without departing from the scope of the novel concepts of the present invention.

Relative terms of location used in the above description, such as "right," "left," "upper," "lower," etc., were employed for the purpose of ease of presentation and are not intended to limit the arrangement of the elements.

I claim:

1. Mechanism for controlling engagement of a friction engaging device arranged to provide for transmission of torque between a drive member and a driven member, comprising means for supplying pressurized fluid, a casing having a control chamber for receiving the pressure fluid, a control device for regulating the fluid pressure in said chamber, means for applying engaging force to the engaging device graduated in accordance with the fluid pressure in said chamber, and manually controlled means for applying opening force on said control device to relieve the pressure in the chamber.

2. Mechanism for controlling engagement of a friction engaging device arranged to provide for transmission of torque between a drive member and a driven member, comprising a pump driven by said drive member, a casing having a control chamber for receiving the output from said pump, a control device for regulating the pressure in said chamber, by-pass means including a fixed diameter relief orifice for the output of said pump for providing a graduated increase in pressure in said chamber in accordance with increase in speed of said pump and said drive member, means for applying engaging force to the engaging device graduated in accordance with the pressure in said chamber, and manually controlled means for applying opening force on said control device to relieve the pressure in said chamber.

3. In a power supply system including an internal combustion engine with a fuel intake manifold, a drive member driven by said engine, a driven member, mechanism for providing a power train between said members and including a friction engaging device for completing the power train, power control means for controlling engagement of said engaging device and including a control device for modulating the engaging force applied to the engaging device, means for applying actuating force on said control device graduated substantially in accordance with changes in vacuum in the intake manifold of said engine whereby the engaging force applied to the engaging device varies as the vacuum in the engine intake manifold, and manually controlled means for actuating said control device to a position for disengaging said engaging device.

4. Mechanism for controlling engagement of a friction device arranged to provide for transmission of torque between a driven member and a drive member which is driven by an internal combustion engine having an intake manifold, comprising means for supplying pressurized fluid, a casing having control chamber for receiving the pressure fluid, a control device for regulating the fluid pressure in said chamber, a servo mechanism fluid connected to said chamber for applying engaging force to the engaging device graduated in accordance with the fluid pressure in said chamber, means for applying opening force on said control device graduated substantially in accordance with the vacuum in the intake manifold of said engine when the engaging device is engaged whereby the pressure in said chamber varies as the vacuum in the engine intake manifold, and manually controlled means for applying opening force on said control device to relieve the pressure in said chamber.

5. Mechanism for controlling engagement of a friction engaging device arranged to provide for transmission of torque between a driven member and a drive member which is driven by an internal combustion engine having an intake manifold, comprising a pump driven by said drive member, a casing having a control chamber for receiving the output from said pump, a control device for regulating the fluid pressure in said chamber, by-pass means including a restricted relief orifice for the output from said pump for providing graduated increases in pressure in said chamber in accordance with increases of speed of said pump and said drive member, a servo mechanism fluid connected to said chamber for applying engaging force to the engaging device graduated in accordance with the fluid pressure in said chamber, means for applying opening force on said control device graduated substantially in accordance with the vacuum in the intake manifold of said engine when the engagement device is engaged, and manually controlled means for applying opening force on said control device to relieve the pressure in said chamber.

6. In a power supply system including an internal combustion engine with an intake manifold and a friction engaging device to provide for transmission of torque from the engine to a driven member, mechanism for controlling engagement of the engaging device comprising means for supplying pressurized fluid, a casing having a control chamber for receiving said fluid, a control device for regulating the fluid pressure in said chamber, a servo mechanism fluid connected to said chamber for applying engaging force to said engaging device graduated in accordance with the fluid pressure in said chamber, biasing mechanism for urging said control device in a direction for increasing the pressure in said chamber, means for modifying the action of said biasing mechanism and including means for applying the vacuum from the intake manifold of said engine to a portion of said control device whereby the pressure in said chamber decreases in response to increases in the manifold vacuum of the engine, and manually controlled means for applying opening force on said control device to relieve the pressure in said chamber.

7. In a power supply system including an internal combustion engine with an intake manifold and a friction engaging device to provide for transmission of torque from the engine to a driven member, mechanism for controlling engagement of the engaging device comprising means for supplying pressurized fluid, a casing having a control chamber for receiving said fluid, a control device for regulating the fluid pressure in said chamber, a servo mechanism fluid connected to said chamber for applying engaging force to said engaging device graduated in accordance with the fluid pressure in said chamber, biasing means for urging said control device toward closed position, means applying the vacuum from the intake manifold of said engine to a portion of said control device to oppose the action of said biasing means, and manually controlled mechanism associated with said control device for applying opening force on said control device to relieve the pressure in said chamber.

8. In a power supply system including an internal combustion engine with an intake manifold and a friction engaging device to provide for transmission of torque from the engine to a driven member, mechanism for controlling engagement of the engaging device comprising a positive displacement pump driven by said engine, a casing having a control chamber for receiving the output from said pump, a control device for regulating the pressure in said chamber, a servo mechanism fluid connected to said chamber for applying engaging force to said engaging device graduated in accordance with the fluid pressure in said chamber, biasing means associated with said control device for urging the same toward closed position, means applying pressure varying in accordance with the vacuum from the intake manifold of said engine to a portion of said control device to urge the control device toward open position, by-pass means for by-passing said control device and including a restricted relief orifice for the output from said pump whereby the pressure in said control chamber is graduated in accordance with increases in speed of said pump and said engine, and manually controlled mechanism associated with said control device for applying opening force on the control device to relieve the pressure in said chamber.

9. In a power supply system including an internal combustion engine with an intake manifold and a friction engaging device to provide for transmission of torque from the engine to a driven member, mechanism for controlling engagement of the engaging device comprising means for supplying pressurized fluid to said mechanism, means for controlling the pressure of said pressurized fluid and including a control chamber receiving said fluid and a control device responsive to pressure in said chamber for by-passing fluid from said chamber back to said fluid supply and for restricting the flow of fluid back to said supply to maintain a fluid pressure in said chamber, a servo mechanism fluid connected to said chamber for applying engaging force to said engaging device graduated in accordance with the fluid pressure in said chamber, means for applying closing force on said control device and including means for applying a pressure greater than but varying in accordance with the pressure of the intake manifold of said engine to a portion of said control device to urge the control device toward closed position, and means associated with said last mentioned means for selectively applying substantially full intake manifold pressure to said portion of said control device.

10. In a power supply system including an engine with a lubrication system and a friction engaging device to provide for transmission of torque from the engine to a driven member, mechanism for controlling engagement of the engaging device comprising means for supplying pressurized fluid to said mechanism and to said lubrication system, a casing having a control chamber for receiving said pressurized fluid, a control device for regulating the fluid pressure in said chamber, a lubrication valve between said supply means and said chamber to prevent fluid from entering said chamber until the pressure of the fluid supplied to said lubrication system has reached a predetermined value, means for applying engaging force to the engaging device graduated in accordance with the fluid pressure in said chamber, and means for applying opening force on said control device.

11. In a power supply system including an internal combustion engine with an intake manifold and a lubrication system and also including a friction engaging device to provide for transmission of torque from the engine to a driven member, fluid actuated mechanism for controlling engagement of the engaging device comprising means for supplying pressurized fluid to said mechanism and to said lubrication system, means for controlling the pressure of said pressurized fluid and including a casing having a control chamber for receiving said fluid and a control device responsive to the pressure in said chamber for by-passing said fluid from said chamber back to said fluid supply and for restricting the flow of fluid back to said supply to maintain the fluid pressure in said chamber, a lubrication valve between said fluid supply means and said chamber to prevent pressure fluid from entering said chamber until the pressure of the fluid supplied to said lubrication system has reached a predetermined value, a servo mechanism fluid connected to said chamber for applying engaging force to said engaging device graduated in accordance with the fluid pressure in said chamber, biasing means associated with said control device for urging the same toward closed position, means for applying vacuum from the intake manifold of said engine to a portion of said control device to urge the control device toward open position, and manually controlled means for applying opening force on said control device to relieve the pressure in said chamber.

12. In a transmission, a drive member, a driven member, mechanism for providing a plurality of power trains between said members and including a friction engaging device for completing the power trains, a casing having a control chamber therein, a pump driven by said drive member for supplying pressurized fluid to said chamber, a control device for regulating the pressure in said chamber, means for applying engaging force to the engaging device graduated in accordance with the fluid pressure in said chamber, by-pass means including a restricted orifice for the relief of fluid pressure in said chamber whereby the engaging force applied to said engaging device is graduated in accordance with the speed of said pump and said drive member, and manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing from one of said power trains to another.

13. In a power supply system including an internal combustion engine with a fuel intake manifold, a drive member driven by said engine, a driven member, mechanism for providing a plurality of power trains between said members and including a friction engaging device for completing the power trains, a casing having a control chamber therein, means for supplying pressurized fluid to said chamber, a control device for regulating the pressure in said chamber, a servo mechanism operatively connected to said chamber for applying engaging force to the engaging device graduated in accordance with the fluid pressure in said chamber, means for applying closing force on said control device graduated in accordance with the changes in vacuum in the intake manifold of said engine when the engaging device is engaged, and manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing from one of said power trains to another.

14. In a power supply system including an internal combustion engine with an intake manifold, a transmission comprising a drive member driven by said engine, a driven member, mechanism for providing a plurality of power trains between said members and including a friction engaging device for completing the power trains, power control means for controlling engagement of said engaging device and including a control device for modulating the engaging force applied to the engaging device, biasing mechanism including means applying the pressure from the intake manifold of said engine to a portion of said control device to urge the control device toward closed position with a graduated force, and manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing from one of said power trains to another.

15. In a power supply system including an internal combustion engine with an intake manifold, a transmission comprising a drive member driven by said engine, a driven member, mechanism for providing a plurality of power trains between said members and including a friction engaging device for completing the power trains, means for supplying pressurized fluid, means for controlling the pressure of said pressurized fluid including a control chamber receiving said fluid and a control device responsive to pressure in said chamber for by-passing fluid from said chamber back to said fluid supply and for restricting the flow of fluid back to said supply to maintain a fluid pressure in said chamber, a servo mechanism fluid connected to said chamber for applying engaging force to said engaging device graduated in accordance with the fluid pressure in said chamber, biasing means for urging said control device toward closed position and including means for applying the vacuum from the intake manifold of said engine to a portion of said control device, and manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing from one of said power trains to another.

16. In a power supply system including an internal combustion engine and an intake manifold, a transmission comprising a drive member driven by said engine, a driven member, mechanism for providing a plurality of power trains between said members and including a friction engaging device for completing the power trains, a casing having a control chamber therein, a pump driven by said drive member for supplying pressurized fluid to said chamber, a control device responsive to pressure in said chamber for by-passing fluid from said chamber back to the intake of the pump and for restricting the flow of fluid back to the pump to maintain a fluid pressure in said chamber, a servo mechanism fluid connected to said chamber for applying engaging force to said engaging device graduated in accordance with the fluid pressure in said chamber, by-pass means including a restricted orifice for the relief of pressure fluid from said chamber whereby the pressure in said chamber increases in accordance with increase in speed of said pump and said drive member, biasing means associated with said control device for urging the same toward closed position, means applying the vacuum from the intake manifold of said engine to a portion of said control device to urge the control device toward open position, and manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing from one of said power trains to another.

17. Mechanism for controlling engagement of a friction engaging device arranged to provide for transmission of torque between a drive member and a driven member, comprising means for supplying pressurized fluid to said mechanism, a casing having a control chamber for receiving said pressurized fluid, control means for by-passing fluid from said chamber back to said supply and for restricting the flow of fluid to said supply to maintain a fluid pressure in said chamber, said control means including a spring biased control valve and a jet flow control orifice with a small effective area relative to said valve, a servo mechanism fluid connected to said chamber for applying engaging force to the engaging device graduated in accordance with the fluid pressure in said chamber, and manually operable mechanism operatively associated with said control valve for selectively moving the same to open position to relieve the fluid pressure in said chamber.

18. Mechanism for controlling engagement of a friction engaging device arranged to provide for transmission of torque between a driven member and a drive member which is driven by an internal combustion engine having an intake manifold, comprising means for supplying pressurized fluid to said mechanism, a casing having a control chamber for receiving said fluid, control means for by-passing fluid from said chamber back to said supply and for restricting the flow of fluid back to said supply to maintain a fluid pressure in said chamber, said control means including a spring biased control valve and a jet flow control orifice with a small effective area relative to said valve, a servo mechanism fluid connected to said chamber for applying engaging force to the engaging device graduated in accordance with the fluid pressure in said conduit, means associated with said control valve for applying opening force on the valve graduated in accordance with the vacuum in the intake manifold of said engine when the engaging device is engaged, and manually operable mechanism operatively associated with said control valve for selectively moving the valve to open position to relieve the pressure in said chamber.

19. In a power supply system including an internal combustion engine with a fuel intake manifold, a drive member driven by said engine, a driven member, mechanism for providing a plurality of power trains between said members and including a friction engaging device for completing the power trains, means for supplying pressurized fluid, a casing having a control chamber for receiving said fluid, control means for by-passing fluid from said chamber back to said supply and for restricting the flow of fluid back to said supply to maintain a fluid pressure in said chamber, said control means including a spring biased control valve and a jet flow control orifice with a small effective area relative to said valve, a servo mechanism fluid connected to said chamber for applying engaging force to the engaging device graduated in accordance with the fluid pressure in said chamber, means for applying closing force on said control valve graduated in accordance with the changes in vacuum in the intake manifold of said engine when the engaging device is engaged, and manually controlled mechanism operatively associated with said control valve and with said power train mechanism for selectively changing between said power trains, said manually controlled mechanism including lost motion means for permitting initial movement of the manually controlled mechanism to actuate said control valve to release the engaging force on said engaging device before actuation of said power train mechanism for changing from one of said power trains to another.

20. In a power supply system including an internal combustion engine with an intake manifold and a friction engaging device to provide for transmission of torque from the engine to a driven member, mechanism for controlling engagement of the engaging device comprising means for supplying pressurized fluid, a casing having a control chamber for receiving said fluid, control means for controlling the fluid pressure in said chamber, a servo mechanism operatively connected to said chamber for applying engaging force to said engaging device graduated in accordance with the fluid pressure in said chamber, biasing means for urging said control means in a pressure increasing direction, means for applying the vacuum from the intake manifold of said engine to first and second portions of said control means to urge the control means in a pressure increasing direction, means applying substantially atmospheric pressure to third and fourth portions of said control means to permit the vacuum to be effective on the control means, and valve means associated with said last defined means for selectively applying substantially atmospheric pressure to one of said first or second portions of said control means.

21. In a power supply system including an internal combustion engine with an intake manifold and a friction engaging device to provide for transmission of torque from the engine to a driven member, mechanism for controlling engagement of the engaging device comprising means for supplying pressurized fluid to said mechanism, a casing having a control chamber for receiving the fluid, control means responsive to the pressure in said chamber for by-passing fluid from said chamber back to said fluid supply and for restricting the flow of fluid back to said supply to maintain a fluid pressure in said chamber, a servo mechanism operatively connected to said chamber for applying engaging force to the engaging device graduated in accordance with the fluid pressure in said chamber, spring means associated with said control means for urging the same in a pressure increasing direction, a flexible diaphragm operatively associated with a portion of said control means, means applying substantially atmospheric pressure to one side of said diaphragm on the other side of said spring means, means for applying the vacuum from the intake manifold of said engine to the other side of said diaphragm to bias said control means in a pressure increasing direction, a valve associated with said last defined means for overriding the same and applying substantially atmospheric pressure to said other side of said diaphragm, a second diaphragm operatively associated with said control means, means applying substantially atmospheric pressure to one side of said second diaphragm, and means for applying the vacuum from the intake manifold of said engine to the other side of said second diaphragm to bias said control means in a pressure increasing direction.

22. Mechanism for controlling engagement of a friction engaging device arranged to provide for transmission of torque between a drive member and a driven member, comprising means for supplying pressurized fluid, a casing having a control chamber for receiving the pressure fluid, control means for regulating the pressure in said chamber and including a shiftable control valve, said valve having a by-pass fluid passage therethrough including a control orifice, a thermostatic valve in said passage and including a member associated with said orifice for decreasing the effective area through the orifice in response to increased temperature of said fluid, and means for applying engaging force to the engaging device graduated in accordance with the fluid pressure in said chamber.

23. Mechanism for controlling engagement of a friction engaging device arranged to provide for transmission of torque between a driven member and a drive member which is driven by an internal combustion engine having an intake manifold, comprising a source of fluid, a pump adapted to draw fluid from said source and to deliver pressurized fluid to said mechanism, a casing having a control chamber for receiving said pressurized fluid, a control valve responsive to the pressure in said chamber for opening the valve to by-pass said pump to lower the fluid pressure in the chamber, a spring biasing said valve toward closed position to restrict the flow of fluid by-passing said pump to maintain the fluid pressure in said chamber, said valve having a by-pass fluid passage therethrough including a control orifice, a thermostatic valve in said passage including a member associated with said orifice for decreasing the effective area through the orifice in response to increased temperature of said fluid, a servo mechanism fluid connected to said chamber for applying engaging force to the engaging device graduated in accordance with the fluid pressure in said chamber, and means for applying closing force on said control valve graduated in accordance with the vacuum in the engine intake manifold when the engaging device is engaged.

24. Mechanism for controlling engagement of a friction engaging device arranged to provide for transmission of torque between a driven member and a drive member which is driven by an internal combustion engine having an intake manifold, comprising means for applying pressurized fluid to said mechanism, a control chamber receiving said pressurized fluid, control means responsive to pressure in said chamber for by-passing fluid from said chamber back to said supply and for restricting the flow of fluid to said supply to maintain a fluid pressure in said chamber, a servo mechanism fluid connected to said chamber for applying engaging force to the engaging device graduated in accordance with the fluid pressure in said chamber, means for applying closing force on said control means graduated substantially in accordance with the changes in vacuum in the intake manifold of said engine when the engaging device is engaged, and pressure release mechanism associated with said control means for urging the same to open position for relieving the pressure in said chamber.

25. Mechanism for controlling engagement of a friction engaging device arranged to provide for transmission of torque between a driven member and a drive member which is driven by an internal combustion engine having an intake manifold, comprising means for applying graduated engaging force to said engaging device, and means associated with said last mentioned means for controlling the engaging force exerted on said engaging device, said control means including a control device movable in engaging force increasing and engaging force decreasing directions, a flexible diaphragm operatively associated with said control device, a spring engaging said diaphragm for moving the same in a direction to move said control device in an engaging force increasing direction, means applying substantially atmospheric pressure to one side of said diaphragm for opposing the force exerted by said spring, means providing a pressure varying as the changes in vacuum in the intake manifold of said engine when said engaging device is engaged, a second flexible diaphragm operatively associated with said control device, a second spring engaging said second diaphragm for urging the same in a direction to move said control device in an engaging force increasing direction, means applying substantially atmospheric pressure to one side of said diaphragm for opposing the force exerted by said second spring, and a control valve for controlling the admission of said intake manifold responsive pressure to the other side of said respective diaphragms to oppose the atmospheric pressure bias exerted on the diaphragms, said valve having a valve member movable to a first position for applying said intake manifold responsive pressure to said other sides of both of said diaphragms and movable to a second position for applying said intake manifold responsive pressure to said other side of said second diaphragm while applying substantially atmospheric pressure to said other side of said first diaphragm.

26. In mechanism actuated by fluid under pressure for controlling engagement of a friction engaging device arranged to provide for transmission of torque between a driven member and a drive member which is driven by an internal combustion engine having an intake manifold and including control means for controlling the pressure of the fluid; means for applying closing force on a portion of the control means, said last defined means comprising a diaphragm operatively associated with said control means portion; means for applying substantially atmospheric pressure to one side of said diaphragm; means for supplying a pressure varying substantially in accordance with the changes in vacuum in the intake manifold of said engine when the engaging device is engaged; means for applying said intake manifold responsive pressure to the other side of said diaphragm to bias said control means portion toward open position; and a valve for controlling the admission of said intake manifold responsive pressure to said other side of said diaphragm and including a port vented to atmospheric pressure, a port vented to said other side of said diaphragm, a movable element for blocking communication between said ports, and control mechanism for selectively moving said element out of blocking position to permit communication between said ports to apply substantially atmospheric pressure to said other side of said diaphragm.

27. In a power supply system including an unsupercharged internal combustion engine with an intake manifold and a friction engaging device to provide for transmission of torque from the engine to a driven member, mechanism for controlling engagement of the engaging device comprising means for supplying pressurized fluid to said mechanism, a casing having a control chamber for receiving said fluid, control means responsive to the pressure in said chamber for by-passing fluid from said chamber back to said fluid supply and for restricting the flow of fluid back to said supply to maintain a fluid pressure to said chamber, a servo mechanism fluid connected to said chamber for applying engaging force to said engaging device graduated in accordance with fluid pressure in said chamber, means for applying the vacuum from the intake manifold of said engine to a portion of said control means to urge the control means toward open position, a valve applying substantially atmospheric pressure to said first portion of said control means, and means acting on said control means for releasing the pressure in said chamber.

28. In a power supply system including an engine with an intake manifold, a throttle device, a variable speed transmission with a shift device for shifting between a low speed ratio and a higher speed ratio, and a friction engaging device arranged to provide for transmission of torque between said engine and said transmission; mechanism for controlling engagement of said engaging device comprising a control element movable between engaging device engaging and disengaging positions and having associated therewith first, second, third and fourth surfaces, first conduit means for applying the vacuum from said engine intake manifold to said first surface to bias said control element toward engaging position, second conduit means for applying substantially atmospheric pressure to said second surface to permit the manifold vacuum to be effective on said first surface, a first spring acting on said first surface for biasing said control element toward engaging position, third conduit means for applying the vacuum of said engine intake manifold to said third surface for biasing the control element toward engaging position, fourth conduit means for applying substantially atmospheric pressure to said fourth surface to permit the manifold vacuum to be effective on said third surface, a second spring acting on said third surface for augmenting the pressure bias thereon, a valve connected to said first and third conduit means and having a port vented to atmospheric pressure, said valve having an element which in one position blocks said port and in another position opens said first conduit means to said port while blocking communication between said first conduit means and said manifold, linkage means between said throttle device and said valve element whereby said element is held in said one position when the throttle device is in closed throttle position and whereby atmospheric pressure from said port is effective to move said element toward said another position when the throttle device is moved toward open throttle position, and a linkage between said shift device and said valve element whereby the element is moved into said another position whenever the shift device is actuated to change from one of said speed ratios to another speed ratio.

29. In mechanism for controlling engagement of a friction engaging device to provide for transmission of torque between a driven member and a drive member which is driven by an internal combustion engine having an intake manifold, control means movable between engaging device engaging and disengaging positions, a source of fluid pressure variable in accordance with the vacuum in the engine intake manifold when the engaging device is engaged, first and second conduit means for applying the variable pressure to respective portions of said control means for biasing the same toward engaging position, a valve connected to said conduit means and having a port vented to atmospheric pressure, said valve having a valve element movable between a first position in which said conduit means are connected to said variable pressure and said port is blocked and a second position in which one of said conduit means are connected to said variable pressure and the other conduit means is connected to atmospheric pressure through said port, means for selectively holding said valve element in said first position or for releasing said valve element whereby said valve element is moved to said second position by atmospheric pressure from said port, and means for selectively overriding said last defined means to hold said valve element in said second position.

30. In a control system for controlling engagement of a friction engaging device, control means including a shiftable control device movable between engaging device engaging and disengaging positions, means for supplying a variable pressure less than atmospheric and including an element movable to a first position for applying said variable pressure to said control means for causing said control device to move toward engaging device disengaging position and movable to a second position for reducing the effect of said variable pressure on said control means by applying atmospheric pressure to a portion of said control means for biasing said control device toward engaging device engaging position.

31. In a control valve for controlling admission of a variable pressure and atmospheric pressure to portions of a fluid motor, a valve casing having a first port connected to atmospheric pressure and a second port connected to said variable pressure, a valve element in said casing and movable to a first portion for blocking said first port to connect said second port to said fluid motor and movable to a second position for closing said second port and for connecting said first port to said fluid motor, first linkage mechanism including spring biasing means for urging said valve element into said first position, said linkage mechanism being movable to a position for releasing said valve element, and second linkage mechanism adapted for moving said valve element into said second position when actuated in one direction against the bias exerted by said first linkage mechanism and adapted for releasing said valve element when moved in another direction.

32. In a vehicle having an internal combustion engine with an intake manifold and a throttle control, said vehicle including a transmission for providing a plurality of power trains with a shift lever for changing between said power trains, a friction engaging device for completing said power trains, power means for controlling engagement of said friction engaging device and including a vacuum responsive device having elements movable in one direction for engaging said engaging device and movable in another direction for disengaging said engaging device, means for supplying the pressure from the manifold of said engine to said vacuum responsive device and including a valve having a valve element movable to one position for admitting said manifold pressure to two portions of said vacuum responsive device for causing disengagement of said engaging device and movable to another position for admitting atmospheric to one of said portions of said responsive device while applying said manifold vacuum pressure to the other portion of said responsive device whereby said engaging device is maintained in an engaged position with a force responsive to changes in said manifold pressure, linkage means operatively connecting said throttle control and said valve element whereby said valve element is held in said one position when said throttle control is in closed throttle position and whereby said linkage means is operatively disconnected from said valve element when said throttle control is moved toward opened throttle position, and second linkage means operatively associated with said shift lever and said valve element for moving said valve element to said another position when the transmission is changed to one of said power trains regardless of the operation of said first linkage means and whereby said second linkage means is operatively disconnected from said valve element when said shift lever is moved to another position for changing to a different power train.

33. In a transmission having mechanism for providing a plurality of power trains and including a shift lever for changing between said power trains, a friction engaging device for completing said power train, power control means for controlling engagement of said friction engaging device and including a fluid responsive device and a valve for controlling admission of fluid to said responsive device, means for supplying fluid under variable pressure to said valve, said valve including a valve element movable to a first position for applying said variable pressure to said fluid responsive device to cause disengagement of said engaging device and movable to a second position for admitting atmospheric pressure to said fluid responsive device to cause engagement of said engaging device, and linkage means for operatively connecting said shift lever and said valve element whereby movement of said shift lever to a position for providing one of said power trains causes movement of said valve element to said second position to cause engagement of said engaging device and whereby movement of said shift lever to another position operatively disconnects said linkage means from said valve element, said linkage means including lost motion mechanism whereby initial movement of said shift lever from said one position to said another position allows said valve element to move to said one position to disengage said engaging device before said shift lever becomes operative to change said transmission from said one power train to another power train.

34. In a vehicle having a driving engine and a throttle control for said engine, mechanism including a friction engaging device for completing a power train from said engine, power means for controlling engagement of said friction engaging device and including a fluid responsive device and a control valve, said control valve having a valve element movable to a first position for admitting atmospheric pressure to said fluid responsie device to cause engagement of said friction engaging device and movable to a second position for blocking the admission of atmospheric pressure to said fluid responsive device to cause engagement of said friction engaging device, linkage means including a lever for operatively connecting said throttle control and said valve element whereby said valve element is held in said second position to cause disengagement of said friction engaging device when said throttle control is in closed throttle position, said linkage means including a spring operatively disposed between said lever and said valve element whereby movement of said throttle control toward open throttle position decreases the force exerted by said spring to decrease the force exerted by said linkage means for holding said valve element in said second position, whereby said linkage means acts through said control valve and said fluid responsive device to provide graduated engagement of said friction engaging device as said throttle control is moved from closed throttle position toward open throttle position.

35. In a vehicle having a driving motor and a throttle control for said motor, mechanism including a friction engaging device for completing a power train from said engine, power means for controlling engagement of said friction engaging device and including a fluid responsive device and a control valve, said control valve having a valve element movable to a first position for admitting atmospheric pressure to said fluid responsive device to cause engagement of said friction engaging device and movable to a second position for blocking the admission of atmospheric pressure to said fluid responsive device to cause engagement of said friction engaging device, linkage means including a lever for operatively connecting said throttle control and said valve element whereby said valve element is held in said second position to cause disengagement of said friction engaging device when said throttle control is in closed throttle position, said linkage means including a spring operatively disposed between said lever and said valve element whereby movement of said throttle control toward open throttle position decreases the force exerted by said spring to decrease the force exerted by said linkage means for holding said valve element in said second position, said linkage means including lost motion mechanism to allow initial movement of said lever to decrease the force exerted by said spring in response to movement of said throttle control toward open throttle position before said vehicle engine is accelerated, whereby said linkage means acts through said control valve and said fluid responsive device to provide graduated engagement of said friction engaging device as said throttle control is moved from closed throttle position toward open throttle position.

36. In a vehicle including a driving engine with a throttle control for accelerating said engine and temperature responsive fast idle means for causing limited acceleration of the engine while the engine is cold, mechanism for providing a power train from said engine and including a friction engaging device for completing the power train from said engine, power means for controlling engagement of said friction engaging device and including a fluid responsive device and a control valve, said control valve having a valve element movable to a first position for admitting atmospheric pressure to said fluid responsive device to cause engagement of said friction engaging device and movable to a second position for blocking the admission of atmospheric pressure to said fluid responsive device to cause engagement of said friction engaging device, linkage means including a lever for operatively connecting said throttle control and said valve element whereby said valve element is held in said second position to cause disengagement of said friction engaging device when said throttle control is in closed throttle position, said linkage means including a spring operatively disposed between said lever and said valve element whereby movement of said throttle control toward open throttle position decreases the force exerted by said spring to decrease the force exerted by said linkage means for holding said valve element in said second position, said linkage means including lost motion mechanism to allow limited opening of said vehicle throttle by said fast idle means without corresponding movement of said lever whereby said valve element is held in said second position to cause said friction engaging device to remain disengaged while said throttle control is in said closed throttle position independent of operation of said fast idle means.

37. In a vehicle having a driving motor and a throttle control for said motor, mechanism including a friction control engaging device for completing a power train from said engine, power means for controlling engagement of said friction engaging device and including a fluid responsive device and a control valve, said control valve having a valve element movable to a first position for admitting atmospheric pressure to said fluid responsive device to cause engagement of said friction engaging device and movable to a second position for blocking the admission of atmospheric pressure to said fluid responsive device to cause disengagement of said friction engaging device, linkage means including a lever for operatively connecting said throttle control and said valve element whereby said valve element is held in said second position to cause disengagement of said friction engaging device when said throttle control is in closed throttle position, said linkage means including a spring operatively disposed between said lever and said valve element whereby movement of said throttle control toward open throttle position decreases the force exerted by said spring to decrease the force exerted by said linkage means for holding said valve element in said second position, said linkage means including a link between said lever and said throttle control, said link being in substantially a dead center position with respect to said lever when said throttle control is in said closed throttle position so that initial movement of said throttle control toward open throttle position provides limited initial movement of said lever with the rate of movement of said lever increasing as said throttle control is moved farther toward open throttle position, whereby initial movement of said throttle control provides initial slow decrease of the spring force holding said valve element in said second position with the spring force decreasing at an increasing rate as the throttle control moves farther toward open throttle position to cause engaging force to be exerted in said engaging device at an increasing rate as said throttle control is moved from said closed throttle position toward open throttle position.

38. In a vehicle having an internal combustion driving engine with an intake manifold, mechanism for providing a power train from said engine and including a friction engaging device for completing the power train, power means for controlling engagement of said friction engaging device and including a vacuum responsive device adapted for being connected with the intake manifold of said engine, valve means for controlling the application of the pressure from said intake manifold to said vacuum responsive device, said valve means including a one-way check valve with a movable valve member adapted for seating to close said check valve and having a restricted by-pass around said valve member, whereby said valve member unseats in response to a sudden decrease in pressure in said intake manifold to permit a sudden decrease in pressure to said vacuum responsive device so that said friction engaging device is disengaged rapidly and whereby said valve member seats in response to a sudden increase in pressure in said intake manifold to provide for relatively slow admission of said increased pressure to said vacuum responsive device through said by-pass so that said friction engaging device is engaged relatively slowly.

39. In a power supply system including an engine with an intake manifold, a throttle device for said engine, a variable speed transmission with a shift device for shifting between a low speed ratio and a higher speed ratio, and a friction engaging device arranged to provide for transmission of torque between said engine and said transmission; mechanism for controlling engagement of said engaging device comprising a control element movable between engaging device engaging and disengaging positions and having associated therewith first and second surfaces, a first conduit for applying the vacuum of said engine intake manifold against said first surface to bias said control element toward engaging device engaging position, a spring adapted for biasing said control element toward engaging device engaging position, a second conduit for applying substantially atmospheric pressure against said second surface to oppose the bias of said spring, first and second valves connected to said first conduit for providing a source of atmospheric pressure when in open position and for blocking said atmospheric pressure when in closed position, a vacuum limit valve between said first conduit and said first and second valves for limiting the vacuum pressure applied to said first surface when one or both of said first or second valves are in open position, linkage means between said throttle device and said first valve for holding the same closed when the throttle is closed and for opening the first valve when the throttle is open, linkage means between said shift device and said second valve for holding the same open when the transmission is in said higher speed ratio, and manual means for holding said control element in engaging device disengaging position.

40. In a power supply system including an engine with an intake manifold, a throttle device for controlling the speed of said engine, a variable speed transmission with a shift device for shifting between a low speed ratio and a higher speed ratio, and a friction engaging device arranged to provide for transmission of torque between said engine and said transmission; mechanism for controlling engagement of said engaging device comprising a control element movable between engaging device engaging and disengaging positions and having associated therewith first and second surfaces, first conduit means for applying the vacuum of said intake manifold against said first surface for biasing said control element toward engaging device engaging position, a spring adapted for biasing said control element toward engaging device engaging position, second conduit means for applying substantially atmospheric pressure against said second surface to oppose the bias of said spring, a first valve connected to said first conduit means for providing a source of atmospheric pressure when in open position and for blocking atmospheric pressure when in closed position, linkage means between said throttle device and said first valve for holding the same closed when the throttle is closed and for opening the first valve when the throttle is open, a vacuum limit valve connected between said first conduit means and said first valve for limiting the vacuum pressure applied to said first surface when said first valve is open, a solenoid associated with said control element for moving the same to engaging device disengaging position when energized, means associated with said shift device and electrically connected to said solenoid for energizing the same whenever actuating force is applied to the shift device, and means responsive to the temperature of the engine for opening said first valve when the engine temperature reaches a normal operating value.

41. In a power supply system including an engine with an intake manifold, a throttle device for controlling the speed of said engine, a variable speed transmission with a shift device for changing between a low speed ratio and a higher speed ratio, a friction engaging device arranged to provide for transmission of torque between said engine and said transmission; mechanism for controlling engagement of said engaging device comprising a control element movable between engaging device engaging and disengaging positions and having associated therewith first and second surfaces, first conduit means for applying the vacuum of said engine intake manifold against said first surface for biasing said control element toward engaging device engaging position, a spring arranged for biasing said control element toward engaging device engaging position, second conduit means for applying substantially atmospheric pressure against said second surface to oppose the bias of said spring, first and second valves connected to said first conduit means for providing a source of atmospheric pressure when in open position and for blocking atmospheric pressure when in closed position, linkage means between said throttle device and said first valve for holding the same open when the throttle is closed and for opening the first valve when the throttle is open, thermostatic means responsive to the temperature of said engine for holding said second valve open when the engine temperature reaches a normal operating value, a vacuum limit valve connected between said second conduit and said first and second valve for limiting the vacuum pressure applied to said first surface when one or both of said first and second valves are open, a solenoid associated with said control element for moving the same to engaging device engaging position when energized, and means associated with said shift device and electrically connected to said solenoid for energizing the same whenever actuating force is applied to the shift device.

42. In a power supply system including an engine with an engine lubrication system and transmission mechanism to provide for transmission of torque from the engine to a driven member, fluid actuated means for completing a power train through said transmission mechanism, means for supplying pressurized fluid to said fluid actuated means and said lubrication system, and a lubrication valve between said supply means and said fluid actuated means to prevent the supplying of pressure fluid to said fluid actuated means until the pressure of the fluid supplied to said lubrication system has reached a predetermined value.

43. In a power supply system including an engine with an engine lubrication system and transmission mechanism to provide for transmission of torque from the engine to a driven member, fluid actuated means for completing a power train through said transmission mechanism, a casing having a control chamber for receiving fluid, means for supplying pressurized fluid to said control chamber and said lubrication system, means operatively connecting said chamber and said fluid actuated means, a control device for regulating the fluid pressure in said chamber, and a lubrication valve between said supply means and said chamber to prevent pressure fluid from entering said chamber until the pressure of the fluid supplied to said lubrication system has reached a predetermined value.

44. In a vehicle having a driving engine and a throttle control for said engine, transmission mechanism driven by said engine adapted for providing a plurality of power trains from said engine and including an engaging device for completing the power trains, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, a manual shift lever for changing between said power trains, and linkage means for operatively connecting said shift lever and said power means whereby movement of said shift lever for providing one of said power trains causes said power means to engage said engaging device irrespective of the position of said throttle control and whereby movement of said shift lever to another position operatively disconnects said shift lever linkage means from said power means.

45. In a vehicle having a driving engine and a throttle control for said engine, a transmission mechanism driven by said engine adapted for providing a plurality of power trains from said engine and including an engaging device for completing the power trains, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, lost motion mechanism in said linkage means whereby said power means causes said engaging device to engage initially before the vehicle engine is accelerated when the throttle control is moved from closed throttle position toward open throttle position, a shift lever for changing between said power trains, and linkage means for operatively connecting said shift lever and said power means whereby movement of said shift lever for providing one of said power trains causes said power means to engage said engaging device irrespective of the position of said throttle control and whereby movement of said shift lever to another position operatively disconnects said shift lever linkage means from said power means, said shift lever linkage means including lost motion mechanism whereby initial movement of said shift lever from said one position to said another position causes said power means to disengage said engaging device before said shift lever becomes operative to change said transmission from said one power train to another power train.

46. In a vehicle having a driving engine and a throttle control for said engine, a transmission mechanism driven by said engine adapted for providing a plurality of power trains from said engine and including an engaging device for completing the power trains, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, a shift lever for changing between said power trains, and linkage means for operatively connecting said shift lever and said power means whereby movement of said shift lever for providing one of said power trains causes said power means to engage said engaging device irrespective of the position of said throttle control and whereby movement of said shift lever to another position operatively disconnects said shift lever linkage means from said power means, said shift lever linkage means including lost motion mechanism whereby initial movement of said shift lever from said one position to said another position causes said power means to disengage said engaging device before said shift lever becomes operative to change said transmission from said one power train to another power train.

47. In a vehicle having a driving engine and a throttle control for said engine, a transmission mechanism driven by said engine adapted for providing a plurality of power trains from said engine and including an engaging device for completing the power trains, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, lost motion mechanism in said linkage means whereby said power means causes said engaging device to engage initially before the vehicle engine is accelerated when the throttle control is moved from closed throttle position toward open throttle position, a manual shift lever for changing between said power trains, and linkage means for operatively connecting said shift lever and said power means whereby movement of said shift lever for providing one of said power trains causes said power means to engage said engaging device irrespective of the position of said throttle control and whereby movement of said shift lever to another position operatively disconnects said shift lever linkage means from said power means.

48. In a vehicle including a driving engine with a throttle control for accelerating said engine and temperature responsive fast idle means for causing limited acceleration of the engine while the engine is cold, a transmission mechanism adapted for providing a power train from said engine and including an engaging device for completing the power train, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, said linkage means including lost motion mechanism to allow limited acceleration of said vehicle engine by said fast idle means without causing actuation of said power means whereby said engaging device remains disengaged while said throttle control is in closed throttle position independent of operation of said fast idle means.

49. In a vehicle including a driving engine with a throttle control for accelerating said engine and temperature responsive fast idle means for causing limited acceleration of the engine while the engine is cold, a transmission mechanism adapted for providing a power train from said engine and including an engaging device for completing the power train, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, lost motion mechanism in said linkage means whereby said power means causes said engaging device to engage initially before the vehicle engine is accelerated when the throttle control is moved from closed throttle position toward open throttle position, said linkage means including additional lost motion mechanism to allow limited acceleration of said vehicle engine by said fast idle means without causing actuation of said power means whereby said engaging device remains disengaged while said throttle control is in closed throttle position independent of operation of said fast idle means.

50. In transmission mechanism including an engaging device for completing a power train through the mechanism, fluid actuated mechanism for causing engagement of said engaging device, and fluid supply means for supplying fluid to said fluid actuated mechanism for causing engagement of said engaging device, valve means for controlling the flow of fluid from said supply means to said fluid actuated mechanism, said valve means comprising a one-way check valve connected between said supply and said fluid actuated mechanism, said check valve having a movable valve member adapted for seating to close the valve and including a restricted by-pass around said valve member, whereby said valve member unseats in response to a sudden surge of fluid in one direction to cause disengagement of said engaging device so that the engaging device is disengaged rapidly, and whereby said valve member seats in response to sudden surges of fluid in the opposite direction to provide for relatively slow passage of fluid through the restricted by-pass so that the engaging device is engaged relatively slowly.

51. In a transmission including a fluid actuated mechanism and a source of fluid supply, means for controlling flow between said mechanism and said supply comprising a one-way check valve connected between said supply and said fluid actuated mechanism, said check valve having a movable valve member adapted for seating to close the valve, and means providing a restricted fluid by-pass around said check valve, whereby said valve member unseats in response to a sudden surge of fluid in one direction to provide for rapid actuation of said fluid actuated mechanism in one direction, and whereby said valve member seats in response to sudden surges of fluid in the opposite direction to provide for relatively slow passage of fluid through the restricted by-pass means to cause relatively slow actuation of said fluid actuated mechanism in the opposite direction.

52. In a transmission, a drive member, a driven member, mechanism for providing a power train between said members and including a friction engaging device for completing the power train, power control means for controlling engagement of said engaging device and including a control device for modulating the engaging force applied to the engaging device, manually controlled means for actuating said control device for causing disengagement of the engaging device, and a manually operable mechanical linkage having a portion engageable with said control device whereby selective manipulation of said linkage actuates said control device to cause disengagement of the engaging device.

53. In a power supply system including an internal combustion engine with an intake manifold and a friction engaging device to provide for transmission of torque from the engine to a driven member, mechanism for controlling engagement of the engaging device comprising means for supplying pressurized fluid, a casing having a control chamber for receiving said fluid, a control device for regulating the fluid pressure in said chamber, a servo mechanism fluid connected to said chamber for applying engaging force to said engaging device graduated in accordance with the fluid pressure in said chamber, biasing mechanism for urging said control device in a direction for increasing the pressure in said chamber, means for modifying the action of said biasing mechanism and including means for applying the pressure from the intake manifold of said engine to a portion of said control device whereby the pressure in said chamber increases in response to increases in the manifold pressure of the engine, a manually operable mechanical linkage having a portion engageable with said control device whereby selective manipulation of said linkage actuates said control device to relieve the fluid pressure in said control chamber to cause disengagement of the engaging device.

54. In a transmission, a drive member, a driven member, mechanism for providing a plurality of power trains between said members and including a friction engaging device for completing the power trains, power control means for controlling engagement of said engaging device and including a control device for modulating the engaging force applied to the engaging device, and manually controlled mechanism operatively associated with said control device and with said power train mechanism for selectively changing between said power trains, said manually controlled mechanism including a lever having a yieldable rubber grommet providing the connection between the manually controlled mechanism and the power train mechanism whereby said rubber grommet provides for limited lost motion for permitting initial movement of the manually controlled mechanism to actuate said control device to release the engaging force on said engaging device before actuation of said power train mechanism for changing from one of said power trains to another.

55. In a power supply system including an internal combustion engine with an intake manifold, a transmission comprising a drive member driven by said engine, a driven member, mechanism for providing a plurality of power trains between said members and including a friction engaging device for completing the power trains, power control means for controlling engagement of said engaging device and including a control device for modulating the engaging force applied to the engaging device, biasing mechanism including means applying the pressure from the intake manifold of said engine to a portion of said control device to urge the control device toward closed position with a graduated force, and manually controlled mechanism operatively associated with said control device and with said power train mechanism for selectively changing between said power trains, said manually controlled mechanism including a lever having a rubber grommet providing the connection between the manually controlled mechanism and the power train mechanism whereby said rubber grommet provides for limited lost motion for permitting initial movement of the manually controlled mechanism to actuate said control device to release the engaging force on said engaging device before actuation of said power train mechanism for changing from one of said power trains to another.

56. In a power supply system including an engine with an intake manifold, a throttle device for said engine, a transmission, and a friction engaging device arranged to provide for transmission of torque between said engine and said transmission; mechanism for controlling engagement of said engaging device comprising a control element movable between engaging device engaging and disengaging positions and having associated therewith first and second surfaces, a first conduit for applying the vacuum of said engine intake manifold against said first surface to bias said control element toward engaging device engaging position, means effective on said second surface additionally biasing said control element toward engaging device engaging position, a second conduit for applying substantially atmospheric pressure on said second surface, first and second valves connected to said first conduit for providing a source of atmospheric pressure when either valve is in open position and for blocking said atmospheric pressure when both valves are in closed position, linkage means between said throttle device and said first valve for holding the valve closed when the throttle device is in closed throttle position and for opening the first valve when the throttle device is moved toward open throttle position, and means for opening said second valve under a predetermined condition of operation of said power supply system.

57. In a power supply system including an engine with an intake manifold, a throttle device for said engine, a transmission, and a friction engaging device arranged to provide for transmission of torque between said engine and said transmission; mechanism for controlling engagement of said engaging device comprising a control element movable between engaging device engaging and disengaging positions and having associated therewith first and second surfaces, a first conduit for applying the vacuum of said engine intake manifold against said first surface to bias said control element toward engaging device engaging position, means effective on said second surface additionally biasing said control element toward engaging device engaging position, a second conduit for applying substantially atmospheric pressure against said second surface, first and second valves connected to said first conduit for providing a source of atmospheric pressure when either valve is in open position and for blocking said atmospheric pressure when both valves are in closed position, a vacuum limit valve between said control element and said first and second valves for limiting the vacuum pressure applied to said first surface when one or both of said first or second valves are in open position, linkage means between said throttle device and said first valve for holding the valve closed when the throttle device is in closed throttle position and for opening the first valve when the throttle device is moved toward open throttle position, and means for opening said second valve under a predetermined condition of operation of said power supply system.

58. In a power system including an engine with an intake manifold, a throttle device for said engine, a transmission, and a friction engaging device arranged to provide for transmission of the torque between said engine and said transmission; mechanism for controlling engagement of said engaging device comprising a control element movable between engaging device engaging and disengaging positions and having associated therewith first and second surfaces, a first conduit for applying the vacuum of said engine intake manifold against said first surface to bias said control element toward engaging device engaging position, means effective on said second surface for additionally biasing said control element toward engaging device engaging position, a second conduit for applying substantially atmospheric pressure against said second surface a valve connected to said first conduit for providing a source of atmospheric pressure when in open position and for blocking said atmospheric pressure when in closed position, a vacuum limit valve between said control element and said first named valve for limiting the vacuum pressure applied to said first surface when said first named valve is in opened position, and linkage means between said throttle device and said first named valve for holding the valve closed when the throttle device is in closed throttle position and for opening the valve when the throttle is moved toward open throttle position.

59. In a power supply system including an engine with an intake manifold, a throttle device for said engine, a transmission, and a friction engaging device arranged to provide for transmission of the torque between said engine and said transmission; mechanism for controlling engagement of said engaging device comprising a control element movable between engaging device engaging and disengaging positions and having associated therewith first and second surfaces, a first conduit for applying the vacuum of said engine intake manifold against said first surface to bias said control element toward engaging device engaging position, a spring effective on said second surface adapted for biasing said control element toward engaging device engaging position, a second conduit for applying substantially atmospheric pressure against said second surface, a ball check valve connected to said first conduit with a port opened to atmospheric pressure and including a ball member for closing said port and a spring for urging said ball member into port closing position, a second ball check valve connected to said first conduit between said control device and said first check valve, said second check valve having a port connected to said first check valve and including a ball member adapted for closing said port and a spring adapted for urging said ball member into port closing position, whereby when both of said valves are closed, full manifold vacuum is applied against said first surface and whereby when said first check valve is open said second check valve provides a pressure in between atmospheric pressure and engine intake manifold pressure against said first surface, and linkage means between said throttle device and said first check valve, said linkage means including a member adapted for compressing said first check valve spring to cause the first check valve to close when said throttle device is in closed throttle position and to release the compressive force on the first check valve spring when the throttle device is moved toward open throttle position.

60. In a transmission, a drive member, a driven member, mechanism for providing a power train between said members and including an engaging device for completing the power train, power control means for controlling engagement of said engaging device and including a control device for modulating the engaging force applied to the engaging device, and manually controlled means including an electric servo motor for overriding said power control means to actuate said control device to cause disengagement of the engaging device.

61. In a power supply system including an internal combustion engine with an intake manifold and a friction engaging device to provide for transmission of torque from the engine to a driven member, mechanism for controlling engagement of the engaging device comprising means for supplying pressurized fluid, a casing having a control chamber for receiving said fluid, a control device for regulating the fluid pressure in said chamber, a servo mechanism fluid connected to said chamber for applying engaging force to said engaging device graduated in accordance with the fluid pressure in said chamber, biasing mechanism for urging said control device in a direction for increasing the pressure in said chamber, means for modifying the action of said biasing mechanism and including means for applying the pressure from the intake manifold of said engine to a portion of said control device whereby the pressure in said chamber increases in response to increase in the manifold pressure of the engine, and manually controlled means including an electric servo motor for overriding said power control means to actuate said control device to cause disengagement of the engaging device.

62. In a transmission, a drive member, a driven member, mechanism for providing a plurality of power trains between said members and including a friction engaging device for completing the power trains, power control means for controlling engagement of said engaging device and including a control device for modulating the engaging force applied to the engaging device, and manually controlling mechanism operatively associated with said control device and with said power train mechanism for selectively changing between said power trains, said manually controlled mechanism including an electric servo motor for overriding said power control means to actuate said control device to cause disengagement of the engaging device and further including lost motion means for permitting initial movement of the manually controlled mechanism to energize the solenoid to actuate said control device and release the engaging force on said engaging device before actuation of said power train mechanism for changing from one of said power trains to another.

63. In a transmission, a drive member, a driven member, mechanism for providing a plurality of power trains between said members and including a friction engaging device for completing the power trains, power control means for controlling engagement of said engaging device and including a control device for modulating the engaging force applied to the engaging device, and manually controlled mechanism operatively associated with said control device and with said power train mechanism for selectively changing between said power trains, said manually controlled mechanism including an electric servo motor for overriding said power control means to actuate said control device to cause disengagement of the engaging device and further including normally open electrical switch means connected to said servo motor whereby initial movement of the manually controlled mechanism closes said switch means to energize said servo motor to actuate said control device and release the engaging force on said engaging device before actuation of said power train mechanism for changing from one of said power trains to another.

64. In a transmission, a drive member, a driven member, mechanism for providing a plurality of power trains between said members and including an engaging device for completing the power trains, means for controlling engagement of said engaging device and including a control device movable between engaging device engaging and disengaging positions, and manually controlled mechanism operatively associated with said control device and with said power train mechanism for selectively changing between said power trains, said manually controlled mechanism including an electrical servo motor adapted for moving said control device to engaging device disengaging position when energized and further including normally open switch means connected to said servo motor whereby initial movement of the manually controlled mechanism closes said switch means to energize said servo motor to actuate said control device to engaging device disengaging position before actuation of said power train mechanism for changing from one of said power trains to another, said manually controlled mechanism also including circuit breaking switch means to break the circuit to said servo motor after the power train change is completed.

65. In a power supply system including an internal combustion engine with an intake manifold, a transmission comprising a drive member driven by said engine, a driven member, mechanism for providing a plurality of power trains between said members and including a friction engaging device for completing the power trains, power control means for controlling engagement of said engaging device and including a control device for modulating the engaging force applied to the engaging device, biasing mechanism including means applying the pressure from the intake manifold of said engine to a portion of said control device to urge the control device toward closed position with a graduated force, and manually controlled mechanism operatively associated with said control device and with said power train mechanism for selectively changing between said power trains, said manually controlled mechanism including an electrical servo motor adapted for moving said control device to engaging device disengaging position when energized and further including normally open switch means connected to said servo motor whereby initial movement of the manually controlled mechanism closes said switch means to energize said servo motor to actuate said control device to engaging device disengaging position before actuation of said power train mechanism for changing from one of said power trains to another, said manually controlled mechanism also including circuit breaking switch means to break the circuit to said servo motor after the power train change is completed.

66. In a vehicle having a driving engine and a throttle control for said engine, a transmission driven by said engine and adapted for providing a power train from the engine, said transmission mechanism including an engaging device for completing the power train, power means for controlling engagement of said engaging device, linkage means for operatively connecting said throttle control and said power means whereby said power means causes engagement of said engaging device when said throttle control is moved toward open throttle position and whereby said power means causes disengagement of said engaging device when said throttle control is moved to closed throttle position, control means operatively associated with said power means and including a temperature responsive member adapted for actuating said power means to cause engagement of said engaging device when a predetermined engine operating temperature is reached regardless of the position of said throttle control.

67. In a vehicle including a driving engine with a throttle control for accelerating said engine and temperature responsive fast idle means for causing limited acceleration of the engine while the engine is cold, a transmission mechanism adapted for providing a power train from said engine and including an engaging device for completing the power train, fluid actuated means for controlling engagement of said engaging device, fluid supply means for supplying variable pressure fluid to said fluid actuated means, a check valve connected to said fluid actuated means and adapted for opening to supply atmospheric pressure to override the effect of said fluid supply means, linkage means for operatively connecting said throttle control and said check valve whereby said check valve is held in closed position to exclude atmospheric pressure from said fluid actuated means when said throttle control is in closed throttle position to cause disengagement of said engaging device and whereby movement of said throttle control toward open throttle position opens said check valve to cause engagement of said engaging device, and a member controlled by said fast idle means and adapted to hold said check valve in open position regardless of the position of said throttle control when the vehicle engine has reached normal operating temperature.

68. In a vehicle including manually controlled means for braking movement of the vehicle and transmission mechanism for providing a plurality of drive ratios with manual shift control means for changing between said drive ratios, a friction engaging device arranged to provide for transmission of torque between the vehicle engine and the transmission mechanism, means for supplying pressurized fluid, a casing having a control chamber for receiving the pressure fluid, control means for regulating the pressure in said chamber and including a shiftable control valve, means providing a restricted by-pass around said control valve for relieving the pressure in said chamber, a thermostatic valve including a member associated with said restricted by-pass for decreasing the effective area through the by-pass in response to increased temperature of said fluid, means for applying engaging force to the engaging device graduated in accordance with the fluid pressure in said chamber, a servo motor associated with said thermostatic valve member and operatively connected to said shift control means whereby movement of said shift control means to a position for providing one power train through the transmission causes energization of said servo motor to move said valve member to a position for closing said by-pass, and control means operatively associated with said brake means and said servo motor whereby actuation of said brake means to slow down movement of the vehicle deenergizes said servo motor irrespective of operation of said shift control means.

69. In a transmission, a drive member, a driven member, mechanism for providing a plurality of power trains between said members and including a friction engaging device for completing the power trains and a manual shift control for changing between said power trains, a casing having a control chamber therein, means for supplying pressurized fluid to said chamber, a control device for regulating the pressure in said chamber, means for applying engaging force to the engaging device graduated in accordance with the fluid pressure in said chamber, by-pass means including a restricted orifice for the relief of fluid pressure in said chamber whereby the engaging force applied to said engaging device is graduated in accordance with the volumetric supply of fluid from said supply means, a thermostatic valve including a member associated with said orifice for decreasing the effective area through the orifice in response to increased temperature of said fluid, an electrical servo motor associated with said thermostatic valve and adapted when energized for actuating said valve to close said orifice regardless of the temperature of said fluid, and linkage means including a normally open electrical switch between said shift control and said electrical servo motor whereby actuation of said shift control to provide one of said power trains in said transmission acts to close said switch to energize said servo motor and to close said orifice.

70. In a vehicle including manually controlled means for braking movement of the vehicle and transmission mechanism for providing a plurality of drive ratios, a friction engaging device arranged to provide for transmission of torque between the vehicle engine and the transmission mechanism, a casing having a control chamber therein, means for supplying pressurized fluid to said chamber, a control device for regulating the pressure in said chamber, means for applying engaging force to the engaging device graduated in accordance with the fluid pressure in said chamber, by-pass means including a restricted orifice for the relief of fluid pressure in said chamber whereby the engaging force applied to said engaging device is graduated in accordance with the volumetric supply of fluid from said supply means, a thermostatic valve including a member associated with said orifice for decreasing the effective area through the orifice in response to increased temperature of said fluid, an electrical servo motor associated with said thermostatic valve and adapted when energized for actuating said valve to close said orifice regardless of the temperature of said fluid, means for energizing said electrical servo motor, and control means including a normally closed electrical switch operatively associated with said brake means and said electrical servo motor whereby actuation of said brake means to slow down movement of the vehicle deenergizes said servo motor irrespective of operation of said servo motor energizing means.

71. In a vehicle including manually controlled means for braking movement of the vehicle and transmission mechanism for providing a plurality of drive ratios with manual shift control means for changing between said drive ratios, a friction engaging device arranged to provide for transmission of torque between the vehicle engine and the transmission mechanism, a casing having a control chamber therein, means for supplying pressurized fluid to said chamber, a control device for regulating the pressure in said chamber, means for applying engaging force to the engaging device graduated in accordance with the fluid pressure in said chamber, by-pass means including a restricted orifice for the relief of fluid pressure in said chamber whereby the engaging force applied to said engaging device is graduated in accordance with the volumetric supply of fluid from said supply means, a thermostatic valve including a member associated with said orifice for decreasing the effective area through the orifice in response to increased temperature of said fluid, an electrical servo motor operatively associated with said thermostatic valve and adapted when energized for actuating said valve to close said orifice regardless of the temperature of said fluid, linkage means including a normally open electrical switch between said shift control and said electrical servo motor whereby actuation of said shift control to provide one of said power trains in said transmission acts to close said switch to energize said servo motor and to close said orifice, and control means including a normally closed electrical switch connected to said servo motor and operatively associated with said brake means whereby actuation of said brake means to slow down movement of the vehicle deenergizes said electrical servo motor irrespective of operation of said shift control means.

72. In a transmission, a drive member, a driven member, mechanism for providing a plurality of power trains between said members and including a friction engaging device for completing the power trains, a casing having a control chamber therein, a pump driven by said driven member for supplying pressurized fluid to said chamber, a control device for regulating the pressure in said chamber, means for applying engaging force to the engaging device graduated in accordance with the fluid pressure in said chamber, by-pass means including a restricted orifice for the relief of fluid pressure in said chamber whereby the engaging force applied to said engaging device is graduated in accordance with the speed of said pump and said drive member, manually controlled mechanism operatively associated with said control device and with said power train mechanism for selectively changing between said power trains, said manually controlled mechanism including lost motion means for permitting initial movement of the manually controlled mechanism to actuate said control device to release the engaging force on said engaging device before actuation of said power train mechanism for changing between said power trains, servo motor means including a valve member associated with said restricted orifice for decreasing the effective area through the orifice when energized, means connecting said manually controlled mechanism and said servo motor means whereby actuation of said manually controlled mechanism to a position for providing one of said power trains causes energization of said servo motor means to move said valve member to a position for closing said orifice.

References Cited in the file of this patent

UNITED STATES PATENTS

| | | |
|---|---|---|
| 2,087,643 | Gillett | July 20, 1937 |
| 2,144,074 | Maybach | Jan. 17, 1939 |
| 2,191,669 | Kress | Feb. 27, 1940 |
| 2,450,161 | Price | Sept. 28, 1948 |
| 2,576,336 | Farkas | Nov. 27, 1951 |
| 2,584,965 | McFarland | Feb. 5, 1952 |
| 2,592,576 | Kelbel | Apr. 15, 1952 |
| 2,595,969 | McFarland | May 6, 1952 |
| 2,597,245 | Kelbel | May 20, 1952 |
| 2,630,893 | Misch et al. | Mar. 10, 1953 |
| 2,633,760 | Kelley | Apr. 7, 1953 |